(12) United States Patent
Fukuzawa et al.

(10) Patent No.: US 10,254,305 B2
(45) Date of Patent: *Apr. 9, 2019

(54) INERTIAL SENSOR

(71) Applicant: Kabushiki Kaisha Toshiba, Tokyo (JP)

(72) Inventors: Hideaki Fukuzawa, Kawasaki Kanagawa (JP); Michiko Hara, Yokohama Kanagawa (JP); Yoshihiko Fuji, Kawasaki Kanagawa (JP); Yoshihiro Higashi, Komatsu Ishikawa (JP); Shiori Kaji, Kawasaki Kanagawa (JP); Akio Hori, Kawasaki Kanagawa (JP); Tomohiko Nagata, Yokohama Kanagawa (JP); Akiko Yuzawa, Kawasaki Kanagawa (JP); Akira Kikitsu, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/724,385

(22) Filed: Oct. 4, 2017

(65) Prior Publication Data

US 2018/0045752 A1 Feb. 15, 2018

Related U.S. Application Data

(62) Division of application No. 14/460,450, filed on Aug. 15, 2014, now Pat. No. 9,810,711.

(30) Foreign Application Priority Data

Sep. 20, 2013 (JP) .................................. 2013-196056

(51) Int. Cl.
*G01P 15/105* (2006.01)
*G01P 15/08* (2006.01)

(52) U.S. Cl.
CPC ........ *G01P 15/105* (2013.01); *G01P 15/0802* (2013.01); *G01P 2015/0805* (2013.01)

(58) Field of Classification Search
CPC ...... G01P 15/02; G01P 15/08; G01P 15/0802; G01P 2215/0805
(Continued)

(56) References Cited

U.S. PATENT DOCUMENTS 6,170,340 B1 1/2001 Horiuchi
7,698,941 B2 4/2010 Sasaki et al.
(Continued)

FOREIGN PATENT DOCUMENTS

JP 2001-160640 6/2001
JP 2008-45908 2/2008
(Continued)

OTHER PUBLICATIONS

Meyners et al., "Pressure sensor based on magnetic tunnel junctions," Journal of Applied Physics, Aug. 4, 2009, 105:1-3.
(Continued)

*Primary Examiner* — Benjamin R Schmitt
(74) *Attorney, Agent, or Firm* — Finnegan, Henderson, Farabow, Garrett & Dunner, L.L.P.

(57) ABSTRACT

An inertial sensor includes a base portion, a weight portion, a connection portion, and a first sensing element unit. The connection portion connects the weight portion and the base portion and is capable of being deformed in accordance with a change in relative position of the weight portion with respect to the position of the base portion. The first sensing element unit is provided on a first portion of the connection portion and includes a first magnetic layer, a second magnetic layer, and a nonmagnetic first intermediate layer. The nonmagnetic first intermediate layer is provided between the first magnetic layer and the second magnetic layer.

10 Claims, 18 Drawing Sheets

(58) Field of Classification Search
USPC .......................................... 73/514.16, 514.31
See application file for complete search history.

(56) References Cited

U.S. PATENT DOCUMENTS

| | | |
|---|---|---|
| 2004/0079174 A1 | 4/2004 | Horiuchi |
| 2006/0246271 A1 | 11/2006 | Quandt |
| 2006/0251928 A1 | 11/2006 | Quandt |
| 2008/0034868 A1 | 2/2008 | Nakatani et al. |
| 2008/0041156 A1 | 2/2008 | Katou |
| 2008/0313882 A1 | 12/2008 | Sasaki et al. |
| 2011/0295128 A1 | 12/2011 | Yuasa et al. |
| 2012/0079887 A1 | 4/2012 | Giddings et al. |
| 2012/0245477 A1 | 9/2012 | Giddings et al. |
| 2013/0076687 A1 | 3/2013 | Giddings et al. |
| 2013/0079648 A1 | 3/2013 | Fukuzawa et al. |
| 2013/0133426 A1 | 5/2013 | Park |
| 2013/0170669 A1 | 7/2013 | Fukuzawa et al. |
| 2013/0255069 A1 | 10/2013 | Higashi et al. |
| 2013/0255393 A1 | 10/2013 | Fukuzawa et al. |
| 2014/0069200 A1 | 3/2014 | Yuasa et al. |
| 2014/0090486 A1 | 4/2014 | Fuji et al. |
| 2014/0137658 A1 | 5/2014 | Higashi et al. |
| 2014/0137668 A1 | 5/2014 | Fukuzawa et al. |

FOREIGN PATENT DOCUMENTS

| | | |
|---|---|---|
| JP | 2009-2947 | 1/2009 |
| JP | 2009-41950 | 2/2009 |
| JP | 2009-122041 | 6/2009 |
| JP | 2011-2300 A | 1/2011 |
| JP | 2012-78186 | 4/2012 |
| JP | 2012-83363 A1 | 4/2012 |
| JP | 2012-176294 | 9/2012 |
| JP | 2012-204479 | 10/2012 |
| JP | 5101659 | 10/2012 |
| JP | 2013-70732 | 4/2013 |
| JP | 2013-72712 | 4/2013 |
| JP | 2013-73374 | 4/2013 |
| JP | 2013-165977 | 8/2013 |
| JP | 2013-205255 | 10/2013 |
| JP | 2013-205403 | 10/2013 |
| JP | 2014-52360 | 3/2014 |
| JP | 2014-74606 | 4/2014 |
| JP | 2014-102171 | 6/2014 |
| JP | 2014-103539 | 6/2014 |
| TW | 1305267 | 1/2009 |

OTHER PUBLICATIONS

Office Action issued by the Taiwanese Intellectual Property Office dated Jun. 3, 2015, for Taiwanese Patent Application No. 103128303, and English-language translation thereof.

US 10,254,305 B2

INERTIAL SENSOR

CROSS-REFERENCE TO RELATED APPLICATIONS

This is a divisional of application Ser. No. 14/460,450, filed Aug. 15, 2014, which is incorporated herein by reference.

This application is based upon and claims the benefit of priority from Japanese Patent Application No. 2013-196056, filed on Sep. 20, 2013; the entire contents of which are incorporated herein by reference.

FIELD

Embodiments described herein relate generally to an inertial sensor.

BACKGROUND

There is an inertial sensor using MEMS (micro electro mechanical systems) technology of a piezoresistance type using silicon (Si), for example. The inertial sensor can sense acceleration as well as inertia, for example. It is desired for the inertial sensor to increase sensitivity.

DETAILED DESCRIPTION

Figure 1A:
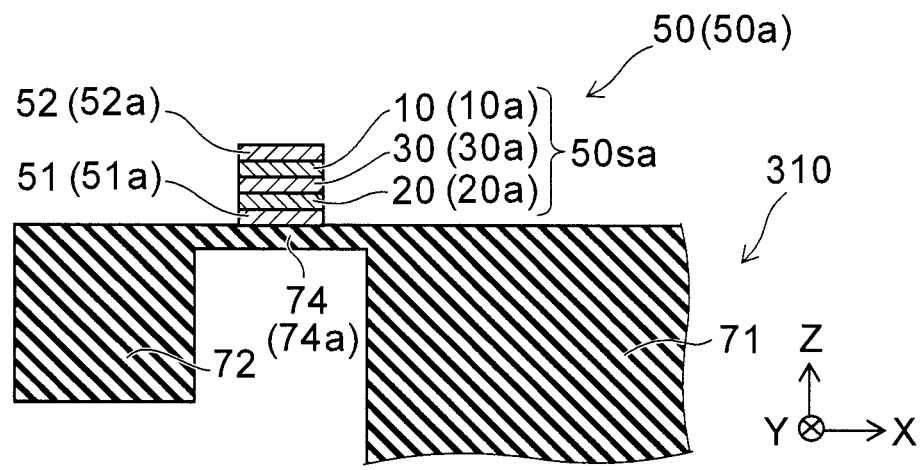
FIG. 1A and FIG. 1B are schematic views showing an inertial sensor according to a first embodiment.

According to one embodiment, an inertial sensor includes a base portion, a weight portion, a connection portion, and a first sensing element unit. The connection portion connects the weight portion and the base portion. The connection portion is configured to be deformed in accordance with a change in a relative position of the weight portion with respect to a position of the base portion. The first sensing element unit is provided on a first portion of the connection portion and includes a first magnetic layer, a second magnetic layer, and a nonmagnetic first intermediate layer. The nonmagnetic first intermediate layer is provided between the first magnetic layer and the second magnetic layer.

Various embodiments will be described hereinafter with reference to the accompanying drawings.

The drawings are schematic or conceptual; and the proportions of sizes among portions, etc. are not necessarily the same as the actual values thereof. Further, the dimensions and proportions may be illustrated differently among drawings, even for identical portions.

In the specification of this application and the drawings, components similar to those described in regard to a drawing thereinabove are marked with the same reference numerals, and a detailed description is omitted as appropriate.

First Embodiment

Figure 1B:
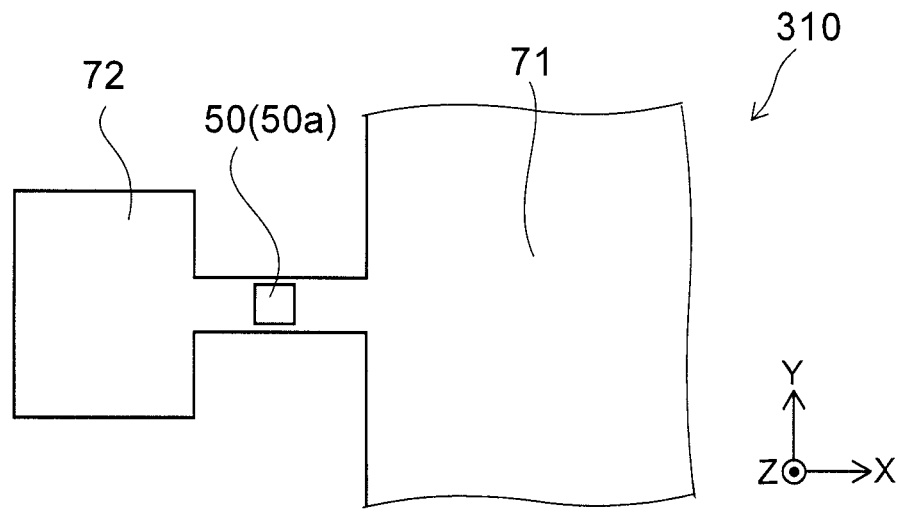

FIG. 1A and FIG. 1B are schematic views illustrating an inertial sensor according to a first embodiment.

FIG. 1A is a schematic cross-sectional view illustrating the inertial sensor. FIG. 1B is a plan view illustrating the inertial sensor. As shown in FIG. 1A and FIG. 1B, an inertial sensor 310 according to the embodiment includes a base portion 71, a weight portion 72, a connection portion 74, and a sensing element unit 50 (a first sensing element unit 50a).

The connection portion 74 connects the weight portion 72 and the base portion 71. The connection portion 74 is configured to be deformed in accordance with the change in relative position of the weight portion 72 with respect to the base portion 71. The connection portion 74 includes a first portion 74a, for example.

The first sensing element unit 50a is provided on the first portion 74a of the connection portion 74, for example. The first sensing element unit 50a is fixed to the first portion 74a, for example. The first sensing element unit 50a includes a first magnetic layer 10a, a second magnetic layer 20a, and a first intermediate layer 30a. The first magnetic layer 10a is a first magnetization free layer 10, for example. The second magnetic layer 20a is a reference layer 20. Also the second magnetic layer 20a may be a magnetization free layer. The first intermediate layer 30a is an intermediate layer 30. The first intermediate layer 30a is provided between the first magnetic layer 10a and the second magnetic layer 20a. The first intermediate layer 30a is nonmagnetic, for example.

The first magnetic layer 10a, the second magnetic layer 20a, and the first intermediate layer 30a are included in a resistance change unit (a first resistance change unit 50sa), for example. In this example, the second magnetic layer 20a is disposed between the first magnetic layer 10a and the connection portion 74. In the embodiment, the first magnetic layer 10a may be disposed between the second magnetic layer 20a and the connection portion 74.

In this example, the first sensing element unit 50a further includes a first electrode 51a (for example, a lower-side electrode 51) and a second electrode 52a (for example, an upper-side electrode 52). The first resistance change unit 50sa is provided between the first electrode 51a and the second electrode 52a.

The first magnetic layer 10a is disposed between the first electrode 51a and the second electrode 52a, for example. The second magnetic layer 20a is disposed between the first magnetic layer 10a and the first electrode 51a. In this example, the first electrode 51a is disposed between the second electrode 52a and the connection portion 74. In the embodiment, the second electrode 52a may be disposed between the first electrode 51a and the connection portion 74.

The direction from the second magnetic layer 20a toward the first magnetic layer 10a is defined as the Z-axis direction (the stacking direction). One direction perpendicular to the Z-axis direction is defined as the X-axis direction. The direction perpendicular to the Z-axis direction and perpendicular to the X-axis direction is defined as the Y-axis direction.

The lengths along the Z-axis direction of the first magnetic layer 10a, the second magnetic layer 20a, and the first intermediate layer 30a correspond to the thicknesses of the respective layers. The length along the Z-axis direction of the connection portion 74 corresponds to the thickness of the connection portion 74. The length along the Z-axis direction of the base portion 71 corresponds to the thickness of the base portion 71. The thickness along the Z-axis direction of the weight portion 72 corresponds to the thickness of the weight portion 72.

The length (thickness) of the connection portion 74 (the first portion 74a) is shorter (thinner) than the length (thickness) of the weight portion 72 in the direction from the base portion 71 toward the weight portion 72 (for example, the X-axis direction), for example. As described later, the length (width) of the connection portion 74 (the first portion 74a) in a direction (the Y-axis direction) perpendicular to the direction from the base portion 71 toward the weight portion 72 (for example, the X-axis direction) is shorter than the length in the X-axis direction of the connection portion 74, for example. Thereby, when the weight portion 72 has moved, the strain is large (for example, at the maximum), for example.

Thereby, the connection portion 74 is deformed more easily than the weight portion 72, for example. The connection portion 74 is deformed in accordance with the change in position of the weight portion 72.

Figure 2A:
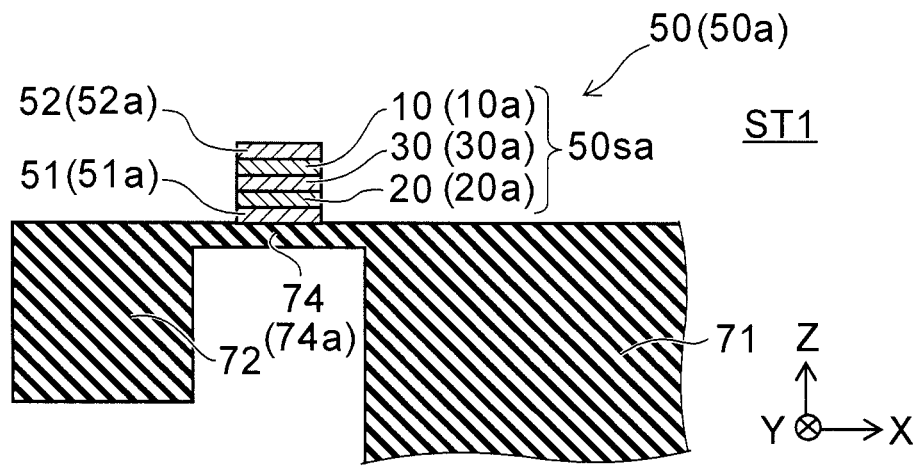
FIG. 2A and FIG. 2B are schematic cross-sectional views showing the inertial sensor according to the first embodiment.
Figure 2B:
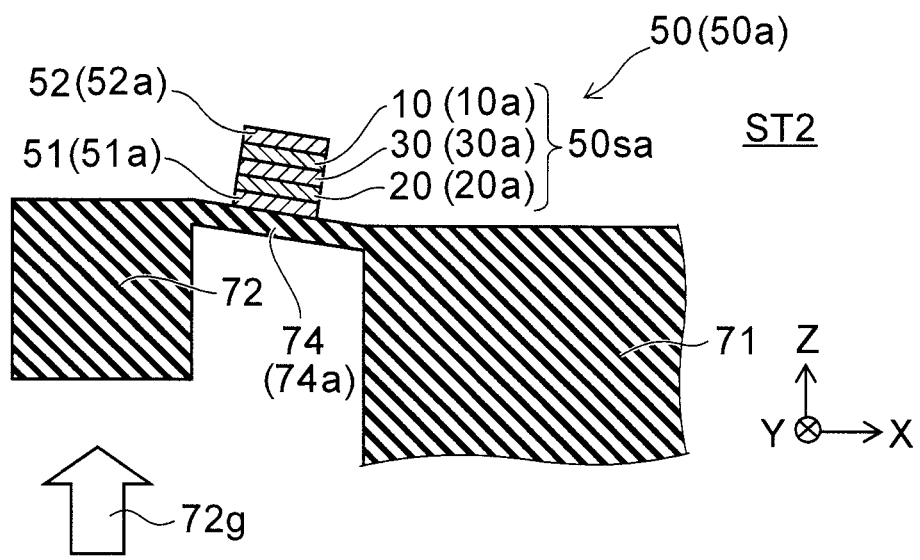

FIG. 2A and FIG. 2B are schematic cross-sectional views illustrating the inertial sensor according to the first embodiment.

FIG. 2A and FIG. 2B correspond to a first state ST1 and a second state ST2, respectively.

As shown in FIG. 2A, in the first state ST1, the relative position of the weight portion 72 with respect to the base portion 71 is a first position. The first state ST1 is a state where no acceleration (force) is applied to the weight portion 72, for example.

As shown in FIG. 2B, in the second state ST2, the relative position of the weight portion 72 with respect to the base portion 71 is a second position. The second position is different from the first position. The second state ST2 is a state where an acceleration 72g is applied to the weight portion 72, for example. The form of the connection portion 74 (the first portion 74a) in the second state ST2 is different from the form of the connection portion 74 (the first portion 74a) in the first state ST1. Thus, the connection portion 74 is deformed in accordance with the change in relative position of the weight portion 72 with respect to the base portion 71.

The base portion 71 is used by being fixed to a moving body, for example, and the base portion 71 moves together with the body it is fixed to. On the other hand, the weight portion 72 is connected to the base portion 71 via the connection portion 74 that can be warped or the like. Thereby, the weight portion 72 can move differently from the movement of the base portion 71. When the base portion 71 has moved, the weight portion 72 does not move together with the base portion 71 substantially, due to inertia, for example. A strain is generated in the connection portion 74 connecting the base portion 71 and the weight portion 72, and the strain is sensed; thereby, at least one of the inertia and the acceleration is sensed.

The direction of the magnetization of the first magnetic layer 10a can change in conjunction with the deformation of the connection portion 74. Also the direction of the magnetization of the second magnetic layer 20a may change in conjunction with the deformation of the connection portion 74.

In the case where the first magnetic layer 10a is a magnetization free layer and also the second magnetic layer 20a is a magnetization free layer, the directions of the magnetizations of both magnetic layers change in conjunction with the deformation of the connection portion 74, for example. In the first state ST1, the magnetization of the first magnetic layer 10a is in a first magnetization direction, and the magnetization of the second magnetic layer 20a is in a second magnetization direction, for example. In the second state ST2, the magnetization of the first magnetic layer 10a is in a direction different from the first magnetization direction, and the magnetization of the second magnetic layer 20a is in a direction different from the second magnetization direction.

In the case where the first magnetic layer 10a is a magnetization free layer and the second magnetic layer 20a is a magnetization fixed layer, the direction of the magnetization of the first magnetic layer 10a changes in conjunction with the deformation of the connection portion 74, for example. In the first state ST1, the magnetization of the first magnetic layer 10a is in the first magnetization direction, and the magnetization of the second magnetic layer 20a is in the second magnetization direction, for example. In the second state ST2, the magnetization of the first magnetic layer 10a is in a direction different from the first magnetization direction, and the magnetization of the second magnetic layer 20a is in the second magnetization direction.

Thus, the direction of the magnetization of the magnetic layer changes with the deformation of the connection portion 74; thereby, the resistance of the current flowing through the first resistance change unit 50sa changes. In the inertial sensor 310, the position (relative position) of the weight portion 72 changes in accordance with the applied acceleration 72g. The connection portion 74 is deformed by the position change, and the direction of the magnetization of the magnetic layer changes in conjunction with the deformation. The acceleration is sensed by sensing the change in resistance in accordance with the change in direction of the magnetization of the magnetic layer. The change in direction of the magnetization is due to the inverse magnetostriction effect described later, and is obtained by utilizing the change in magnetization direction of the magnetic layer when a strain is generated in the magnetic layer in conjunction with the deformation.

Examples of the change in magnetization in the resistance change unit (the first resistance change unit 50sa) and the change in resistance will now be described. In the following, for easier description, a description is given for the case where the second magnetic layer 20a is a magnetization fixed layer and the first magnetic layer 10a is a magnetization free layer. In the sensing element unit 50, "inverse magnetostriction effect" that ferromagnetic materials have and "MR effect" that is exhibited in the resistance change unit are utilized.

The "MR effect" is a phenomenon in which, in a stacked film including a magnetic material, the value of the electric resistance of the stacked film changes due to the change in magnetization of the magnetic material when an external magnetic field is applied. The MR effect includes GMR (giant magnetoresistance) effect, TMR (tunneling magnetoresistance) effect, or the like, for example. The MR effect is exhibited by passing a current through the resistance change unit to read the change in relative angle between the directions of the magnetizations as an electric resistance change. Based on the stress applied to the sensing element unit 50, a tensile stress is applied to the resistance change unit, for example. At this time, the direction of the magnetization of the first magnetic layer 10a changes in accordance with the magnitude and direction of the stress. The value of the resistance accompanying the current passed through the magnetic layer changes in accordance with the relative angle between the magnetization direction of the second magnetic layer 20a and the magnetization direction of the first magnetic layer 10a. When the resistance in the low resistance state is denoted by R and the amount of change in electric resistance that changes due to the MR effect is denoted by $\Delta R$, $\Delta R/R$ is referred to as the "MR ratio."

Figures 3A, 3B:
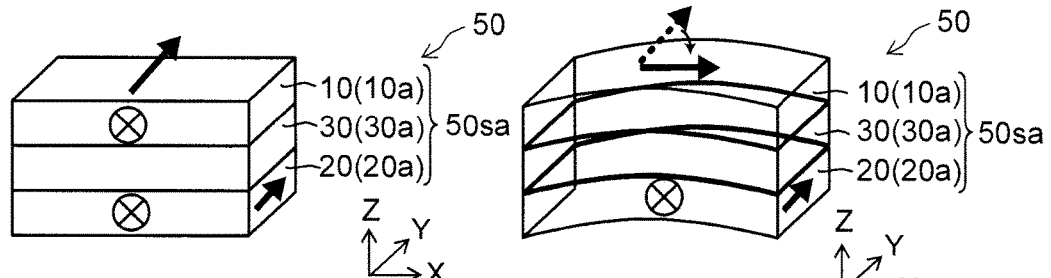
FIG. 3A to FIG. 3C are schematic perspective views showing operations of the inertial sensor according to the first embodiment.
Figure 3C:
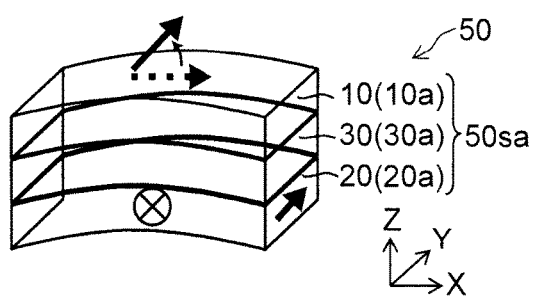

FIG. 3A to FIG. 3C are schematic perspective views illustrating operations of the inertial sensor according to the first embodiment.

The drawings illustrate different states of the sensing element unit 50. The drawings illustrate relationships between the magnetization direction in the sensing element unit 50 and the direction of tensile stress.

FIG. 3A shows a state where no tensile stress is applied. At this time, in this example, the direction of the magnetization of the second magnetic layer 20a (the reference layer 20) is the same as the direction of the magnetization of the first magnetic layer 10a (the magnetization free layer 10).

FIG. 3B shows a state where a tensile stress is applied. In this example, a tensile stress is applied along the X-axis direction. The tensile stress along the X-axis direction is applied by the deformation of the connection portion 74, for example. That is, the tensile stress is applied in a direction orthogonal to the direction (in this example, the Y-axis direction) of the magnetization of the second magnetic layer 20a (the reference layer 20) and the first magnetic layer 10a (the magnetization free layer 10). At this time, the magnetization of the first magnetic layer 10a (the magnetization free layer 10) rotates so as to be the same direction as the direction of the tensile stress. This is referred to as "inverse magnetostriction effect." At this time, the magnetization of the second magnetic layer 20a (the reference layer 20) is fixed. By the rotation of the magnetization of the first magnetic layer 10a (the magnetization free layer 10), the relative angle between the direction of the magnetization of the second magnetic layer 20a (the reference layer 20) and the direction of the magnetization of the first magnetic layer 10a (the magnetization free layer 10) is changed.

In FIG. 3B, the magnetization direction of the second magnetic layer 20a (the reference layer 20) is shown as an example. The magnetization direction may not be the direction shown in FIG. 3B.

In the inverse magnetostriction effect, the easy axis of magnetization varies with the sign of the magnetostriction constant of a ferromagnetic material. In many materials exhibiting a large inverse magnetostriction effect, the magnetostriction constant has the plus sign. In the case where the magnetostriction constant is the plus sign, the direction in which a tensile stress is applied as described above is the magnetization easy axis. In other words, in the case where the magnetostriction constant is plus, the magnetization of the first magnetic layer 10a (the magnetization free layer 10) rotates toward the direction of the magnetization easy axis in which the tensile stress is applied as mentioned above. On the other hand, in the case where the magnetostriction constant is the minus sign, a direction perpendicular to the direction in which the tensile stress is applied is the magnetization easy axis. In this case, due to the stress application, the magnetization direction of the first magnetic layer 10a is directed to the direction perpendicular to the direction in which the stress is applied.

In the case where the magnetostriction constant of the first magnetic layer 10a (the magnetization free layer 10) is plus, the initial magnetization direction of the first magnetic layer 10a (the magnetization free layer 10) (the magnetization direction when no stress is applied) is set to a direction different from the direction in which the tensile stress is applied, for example. On the other hand, in the case where the magnetostriction constant is minus, a direction perpendicular to the direction in which the tensile stress is applied is the magnetization easy axis.

FIG. 3C illustrates a state where the magnetostriction constant is minus. In this case, the initial magnetization direction of the first magnetic layer 10a (the magnetization free layer 10) (the magnetization direction when no stress is applied) is set to a direction different from the directions perpendicular to the direction (in this example, the X-axis direction) in which the tensile stress is applied.

In FIG. 3C, the magnetization direction of the second magnetic layer 20a (the reference layer 20) is shown as an example. The magnetization direction may not be the direction shown in FIG. 3C.

The electric resistance of the sensing element unit 50 (the resistance change unit) changes due to the MR effect in accordance with the angle between the magnetization of the first magnetic layer 10a and the magnetization of the second magnetic layer 20a, for example.

The magnetostriction constant ($\lambda$s) represents the magnitude of the deformation when an external magnetic field is applied and a ferromagnetic layer is magnetically saturated in a certain direction. Assuming that the length of the ferromagnetic layer in a state where there is no external magnetic field is L, when the length of the ferromagnetic layer has changed by $\Delta L$ when an external magnetic field is applied, the magnetostriction constant $\lambda$s is expressed by ΔL/L. Although the amount of change varies with the magnitude of the magnetic field, the magnetostriction constant $\lambda s$ is expressed as ΔL/L in a state where a sufficient magnetic field is applied and magnetization is saturated.

In the case where the second magnetic layer 20a (the reference layer 20) is a magnetization fixed layer, Fe, Co, Ni, or an alloy material of them is used for the second magnetic layer 20a, for example. Furthermore, a material in which an additive element is added to the material mentioned above or the like is used for the second magnetic layer 20a. CoFe alloy, CoFeB alloy, NiFe alloy, and the like may be used for the second magnetic layer 20a, for example. The thickness of the second magnetic layer 20a is not less than 2 nanometers (nm) and not more than 6 nm, for example.

For the first intermediate layer 30a, a metal or an insulator may be used. As the metal, Cu, Au, Ag, and the like may be used, for example. In the case of metals, the thickness of the first intermediate layer 30a is not less than 1 nm and not more than 7 nm, for example. As the insulator, a magnesium oxide (MgO etc.), an aluminum oxide ($Al_2O_3$ etc.), a titanium oxide (TiO etc.), a zing oxide (ZnO etc.), or the like may be used, for example. In the case of insulators, the thickness of the first intermediate layer 30a is not less than 1 nm and not more than 3 nm, for example.

In the case where the first magnetic layer 10a is a magnetization free layer, at least one of Fe, Co, and Ni or an alloy material including at least one of them is used for the first magnetic layer 10a, for example. A material in which an additive element is added to the material mentioned above is used.

For the first magnetic layer 10a, a material with a large magnetostriction (magnetostriction constant) is used. Specifically, a material of which the absolute value of the magnetostriction is larger than $10^{-5}$ is used. Thereby, the magnetization changes sensitively with the strain. For the first magnetic layer 10a, either a material having a positive magnetostriction or a material having a negative magnetostriction may be used.

For the first magnetic layer 10a, a single element metal of Fe, Co, or Ni may be used, for example. For the first magnetic layer 10a, an alloy including at least one of Fe, Co, and Ni may be used, for example. Other than them, for the first magnetic layer 10a, Fe—Co—Si—B alloy, a Tb-M-Fe alloy (M being Sm, Eu, Gd, Dy, Ho, or Er), a Tb-M1-Fe-M2 alloy (M1 being Sm, Eu, Gd, Dy, Ho, or Er; M2 being Ti, Cr, Mn, Co, Cu, Nb, Mo, W, or Ta), an Fe-M3-M4-B alloy (M3 being Ti, Cr, Mn, Co, Cu, Nb, Mo, W, or Ta; M4 being Ce, Pr, Nd, Sm, Tb, Dy, or Er), Ni, Al—Fe, a ferrite ($Fe_3O_4$, $(FeCo)_3O_4$, or the like), and the like may be used. In the Tb-M-Fe alloy and the Fe-M3-M4-B alloy mentioned above, the magnetostriction constant $\lambda s$ is larger than 100 ppm. The thickness of the first magnetic layer 10a is 2 nm or more, for example.

The first magnetic layer 10a may have a two-layer structure. In this case, the first magnetic layer 10a may include a layer of FeCo alloy and the following layer stacked with the layer of FeCo alloy. The layer of FeCo alloy is stacked with a layer of a material selected from Fe—Co—Si—B alloy, a Tb-M-Fe alloy (M being Sm, Eu, Gd, Dy, Ho, or Er), a Tb-M1-Fe-M2 alloy (M1 being Sm, Eu, Gd, Dy, Ho, or Er; M2 being Ti, Cr, Mn, Co, Cu, Nb, Mo, W, or Ta), an Fe-M3-M4-B alloy (M3 being Ti, Cr, Mn, Co, Cu, Nb, Mo, W, or Ta; M4 being Ce, Pr, Nd, Sm, Tb, Dy, or Er), Ni, Al—Fe, a ferrite ($Fe_3O_4$, $(FeCo)_3O_4$, or the like), and the like. In the Tb-M-Fe alloy and the Fe-M3-M4-B alloy mentioned above, the magnetostriction constant $\lambda s$ is larger than 100 ppm.

When the magnetostriction constant of the first magnetic layer 10a is large as mentioned above, a high strain sensitivity GF (gauge factor) is obtained. The value of the GF is greatly influenced by not only the magnetostriction constant but also the soft magnetic properties of the first magnetic layer 10a. The strain sensitivity GF is expressed by GF= $(dR/R)/\Delta \varepsilon$, where $\Delta \varepsilon$ is the strain, R is the resistance, and ΔR is the change in resistance when a strain of $\Delta \varepsilon$ is given. The strain sensitivity GF represents the magnitude of the amount of resistance change in a unit strain change, and is a dimensionless amount.

It is found that a material that is an alloy including Fe and has an amorphous structure has a large GF, for example. In this material, a GF value of 3,000 or more is obtained, for example.

In the specification of this application, the amorphous structure includes microcrystalline structures. In microcrystalline structures, the size of the crystal grain is larger than 2 nm. The amorphous structure further includes structures having crystal structure not found. Microcrystalline structures or structures having crystal structure not found can be observed by a real image obtained by a transmission electron microscope, for example. Furthermore, electron diffraction using a microbeam in a magnetic layer may be used, for example. Determination can be made by whether the electron diffraction pattern exhibits a spot pattern or a ring-like pattern, for example. The spot pattern corresponds to a crystal structure, for example. The ring-like pattern corresponds to an amorphous structure. Examples of the electron diffraction are described later.

The structure of the first magnetic layer 10a is made amorphous by using Fe including B (Boron) as the first magnetic layer 10a, for example. In the embodiment, a functional layer like the following may be provided.

Figure 4:
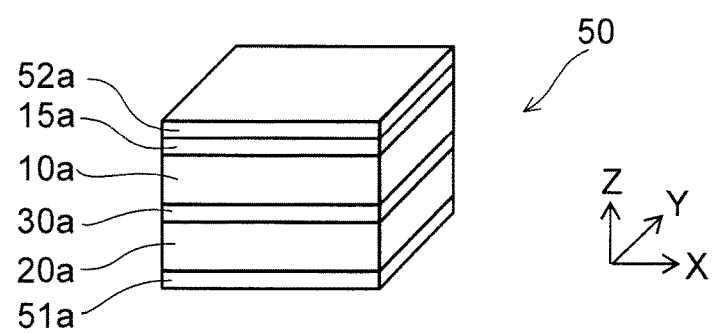
FIG. 4 is a schematic perspective view showing part of the inertial sensor according to the first embodiment.
Figure 5A:
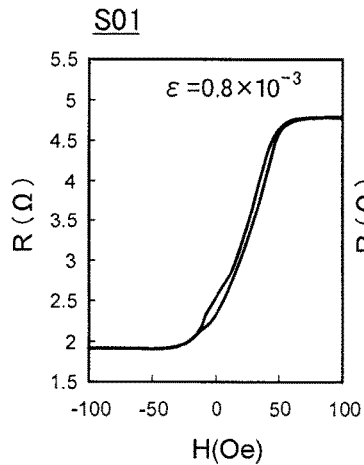
FIG. 5A to FIG. 5I are graphs showing characteristics of inertial sensors.
Figure 5B:
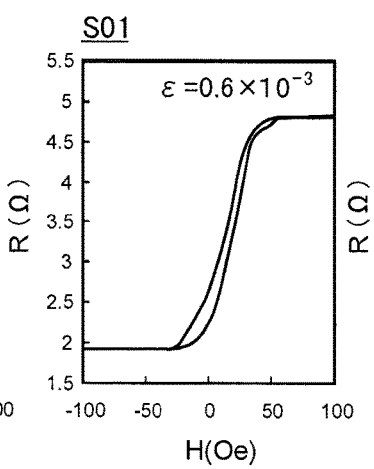
Figure 5C:
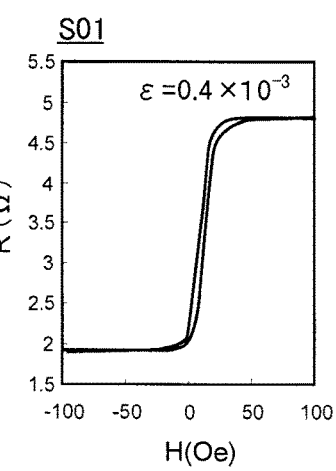
Figure 5D:
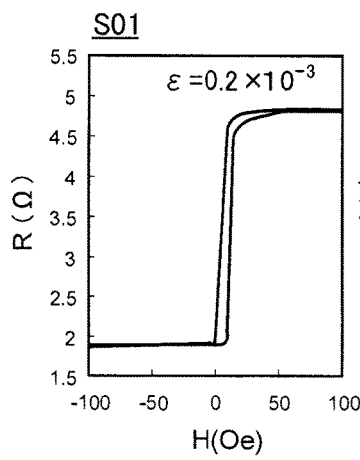
Figure 5E:
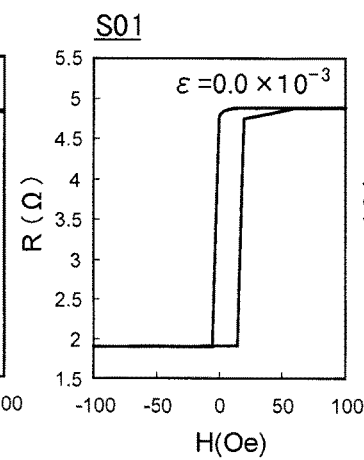
Figure 5F:
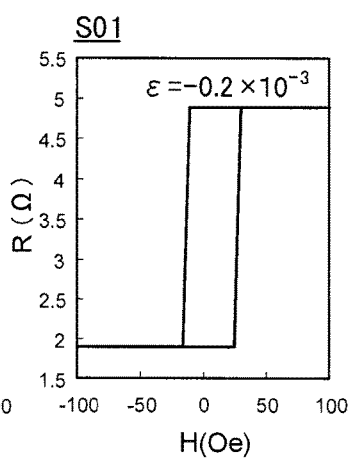
Figure 5G:
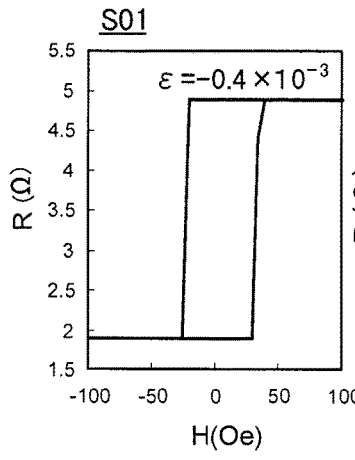
Figure 5H:
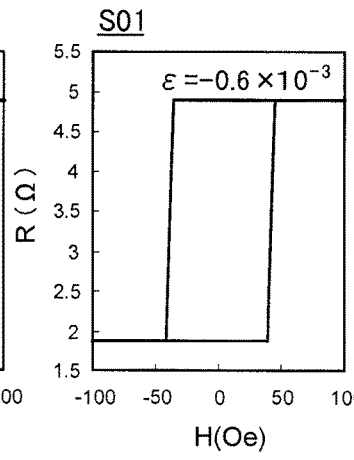
Figure 5I:
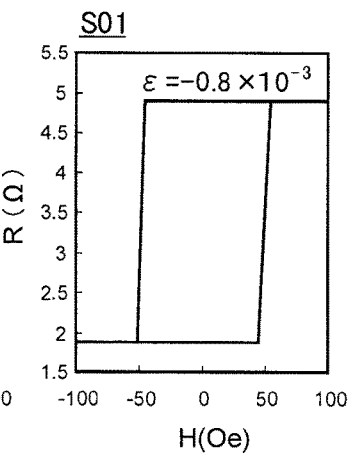
Figure 6A:
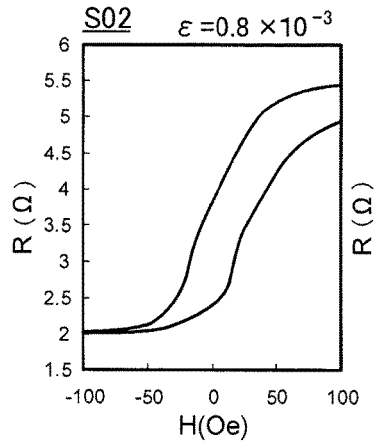
FIG. 6A to FIG. 6I are graphs showing characteristics of inertial sensors.
Figure 6B:
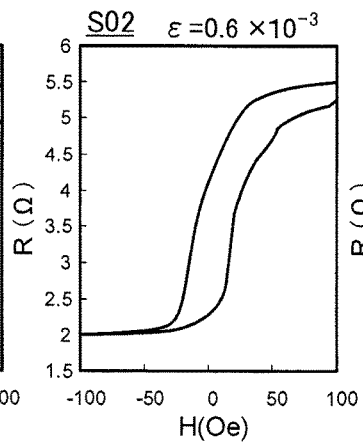
Figure 6C:
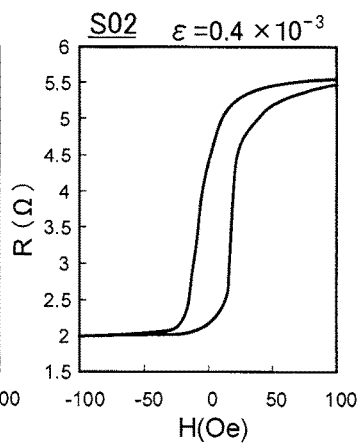
Figure 6D:
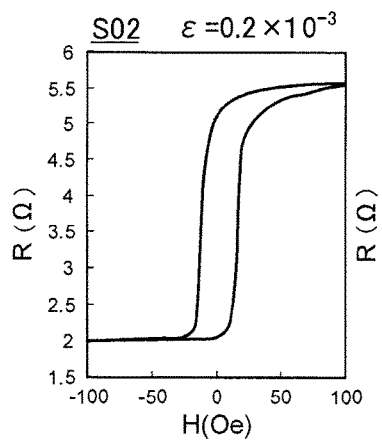
Figure 6E:
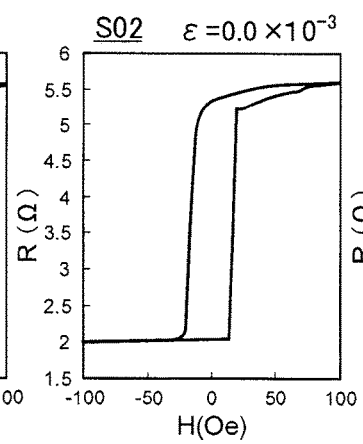
Figure 6F:
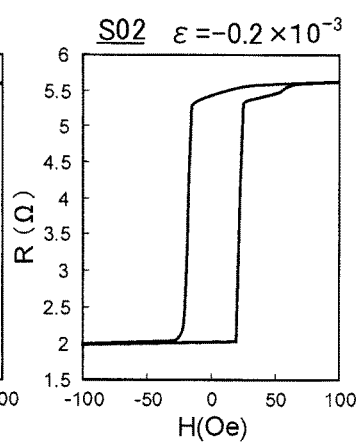
Figure 6G:
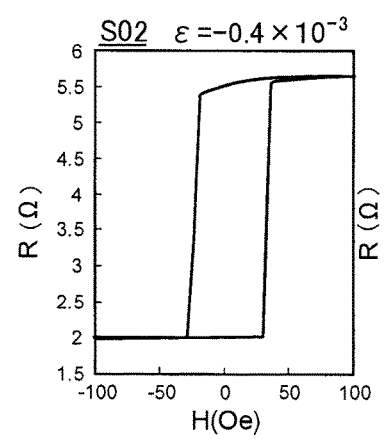
Figure 6H:
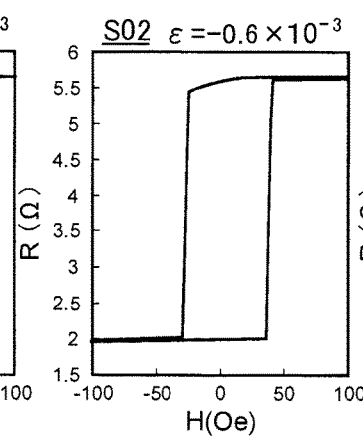
Figure 6I:
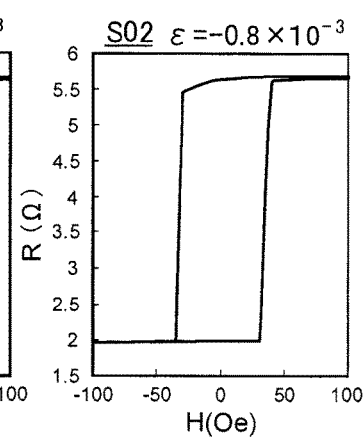

FIG. 4 is a schematic perspective view illustrating part of the inertial sensor according to the first embodiment.

As shown in FIG. 4, the first magnetic layer 10a is disposed between a functional layer 15a and the first intermediate layer 30a. By providing the functional layer 15a, the concentration of B in the first magnetic layer 10a can be increased. The first magnetic layer 10a (for example, a CoFeB layer, thickness: 4 nm) is provided on the first intermediate layer 30a (an MgO layer), for example. On the first magnetic layer 10a, an MgO layer with a thickness of 1.5 nm is provided as the functional layer 15a. Thereby, the structure of CoFeB layer is made amorphous (including a microcrystalline structure). In this case, the coercive force is 4 Oe or less, and the value of the GF is not less than 3,000 and not more than 4,000.

FIG. 5A to FIG. 5I and FIG. 6A to FIG. 6I are graphs illustrating characteristics of inertial sensors.

FIG. 5A to FIG. 5I show characteristics of a first sample S01. FIG. 6A to FIG. 6I are graphs showing characteristics of a second sample S02. In the first sample S01, the MgO layer mentioned above is used as the functional layer 15a. In the second sample S02, a Ta layer is used as the functional layer 15a.

FIG. 5A to FIG. 5I show the measurement results of the magnetic field dependence of the electric resistance when the strain ε is $0.8 \times 10^{-3}$, $0.6 \times 10^{-3}$, $0.4 \times 10^{-3}$, $0.2 \times 10^{-3}$, $0.0 \times 10^{-3}$, $-0.2 \times 10^{-3}$, $-0.4 \times 10^{-3}$, $-0.6 \times 10^{-3}$, and $-0.8 \times 10^{-3}$, respectively. FIG. 6A to FIG. 6I show the measurement results of the magnetic field dependence of the electric resistance when the strain ε is $0.8 \times 10^{-3}$, $0.6 \times 10^{-3}$, $0.4 \times 10^{-3}$, $0.2 \times 10^{-3}$, $0.0 \times 10^{-3}$, $-0.2 \times 10^{-3}$, $-0.4 \times 10^{-3}$, $-0.6 \times 10^{-3}$, and $-0.8 \times 10^{-3}$, respectively.

As shown in the drawings, the characteristics change greatly with the material of the functional layer 15a.

Figure 7A:
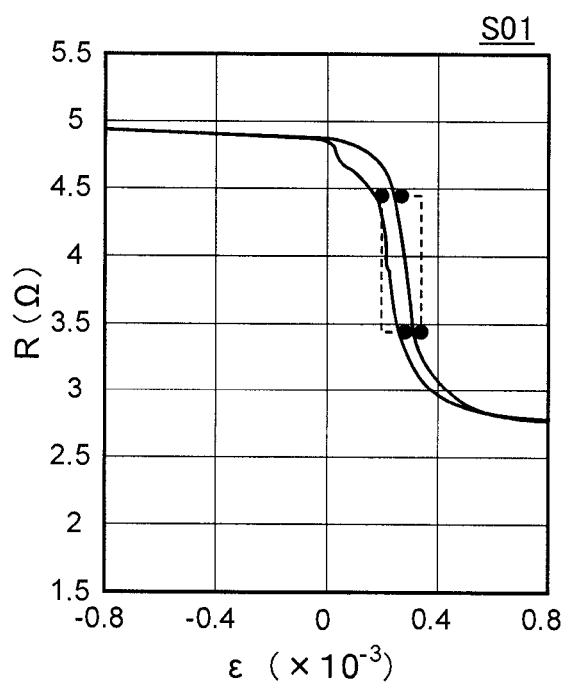
FIG. 7A and FIG. 7B are graphs showing characteristics of inertial sensors.
Figure 7B:
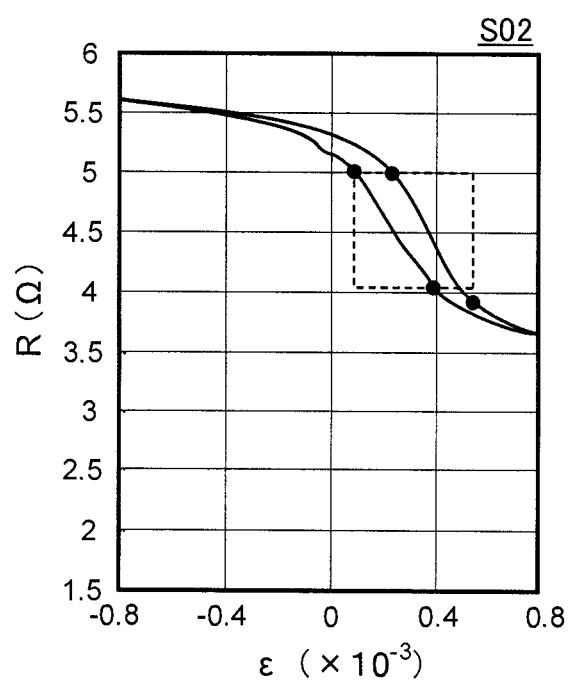

FIG. 7A and FIG. 7B are graphs illustrating characteristics of inertial sensors.

FIG. 7A corresponds to the first sample S01, and FIG. 7B corresponds to the second sample S02. The drawings show the change in electric resistance R when the external magnetic field H is fixed and the strain ε is changed continuously in a range between $-0.8 \times 10^{-3}$ and $0.8 \times 10^{-3}$. The horizontal axis of the drawings is the strain E, and the vertical axis is the electric resistance R. The change in strain ε includes both the change from $-0.8 \times 10^{-3}$ toward $0.8 \times 10^{-3}$ and the change from $0.8 \times 10^{-3}$ toward $-0.8 \times 10^{-3}$. The results show strain sensor characteristics. The gauge factor GF is calculated from the drawings.

From FIG. 7A, the gauge factor in the first sample S01 is calculated to be 4027. From FIG. 7B, the gauge factor in the second sample S02 is calculated to be 859.

Thus, a large gauge factor can be obtained by using the functional layer 15a of MgO to make the first magnetic layer 10a an amorphous structure.

It is presumed that the functional layer 15a of MgO suppresses the diffusion of B from the first magnetic layer 10a. The functional layer 15a functions as a diffusion barrier layer, for example. An MgO layer with a low sheet resistance is provided as the functional layer 15a, for example. A layer having a sheet resistance of approximately not more than 5 times the sheet resistance of the MgO layer used as the first intermediate layer 30a is used as the functional layer 15a, for example. The design is made so that the sheet resistance RA of the whole stacked film is not increased substantially when the functional layer 15a is provided Examples of the difference in the crystal state of the first magnetic layer 10a depending on the presence or absence of the functional layer 15a will now be described.

FIG. 8A to FIG. 8D are microscope images illustrating characteristics of an inertial sensor.

FIG. 9A to FIG. 9D are microscope images illustrating characteristics of an inertial sensor.

FIG. 8A to FIG. 8D correspond to the first sample S01, and FIG. 9A to FIG. 9D correspond to the second sample S02.

Figure 8A:
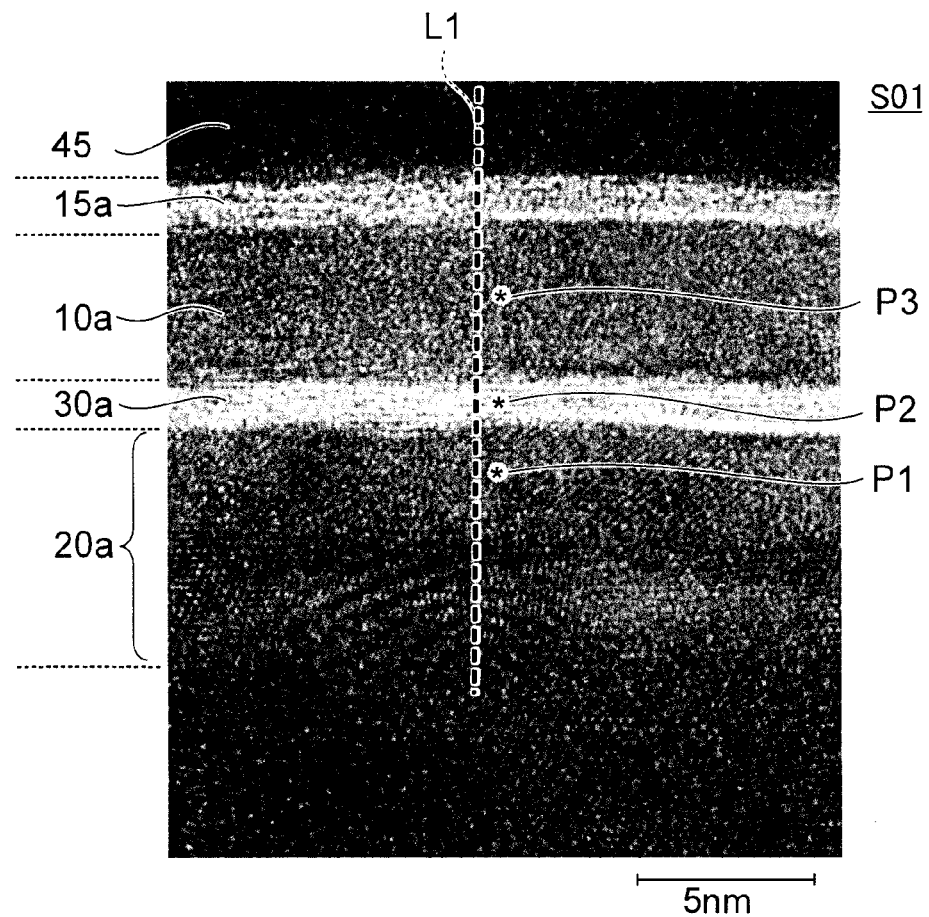
FIG. 8A to FIG. 8D are microscope images showing characteristics of an inertial sensor.
Figures 8B, 8C, 8D:
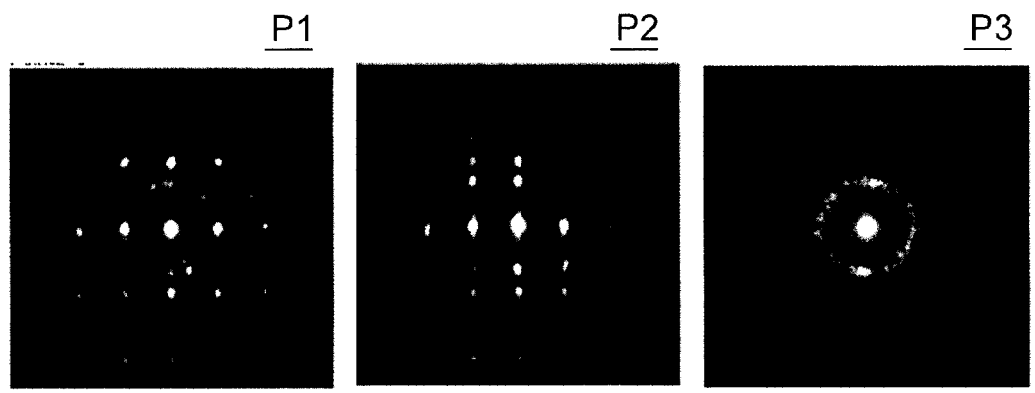
Figure 9A:
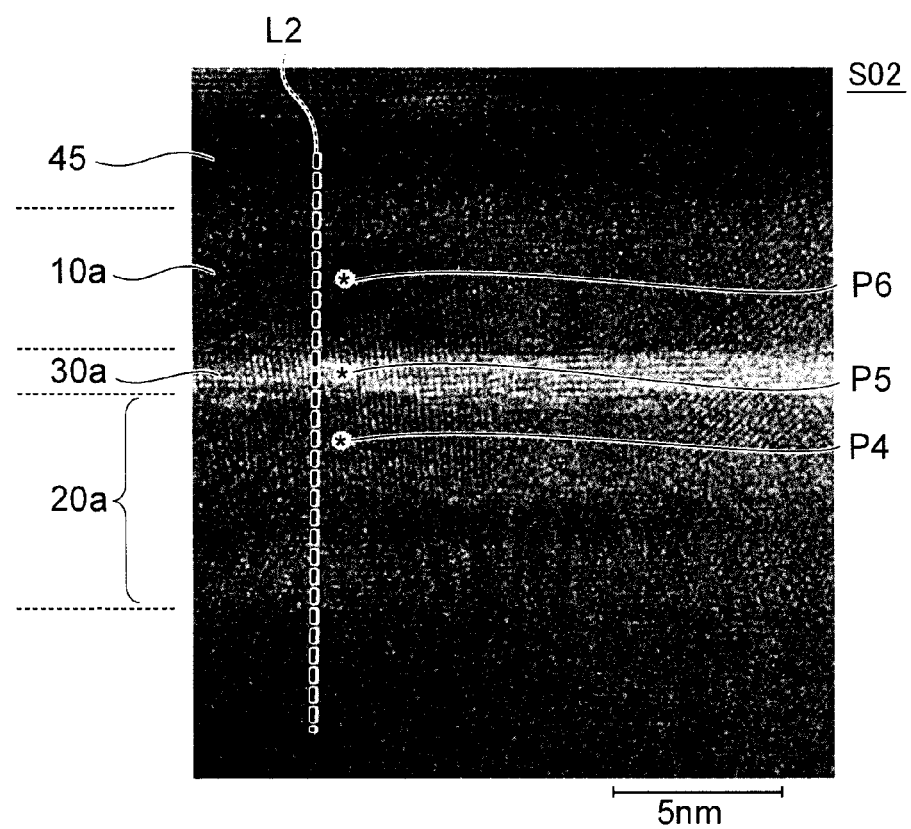
FIG. 9A to FIG. 9D are microscope images showing characteristics of an inertial sensor.
Figures 9B, 9C, 9D:
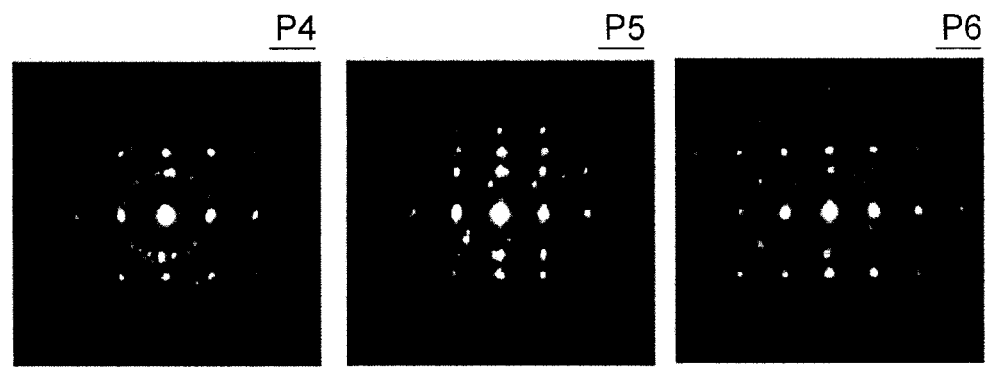

FIG. 8A is a cross-sectional transmission electron microscope (cross-sectional TEM) photographic image of the inertial sensor of the first sample S01. FIG. 8B to FIG. 8D are crystal lattice diffraction images obtained by nanodiffraction of an electron beam of points P1 to P3 of FIG. 8A, respectively. FIG. 9A is a photograph of the stacked structure of the second sample S02. FIG. 9B to FIG. 9D are crystal lattice diffraction images obtained by nanodiffraction of an electron beam of points P4 to P6 of FIG. 9A, respectively.

As shown in FIG. 8A, in the first sample S01, the first intermediate layer 30a is provided on the second magnetic layer 20a, and the first magnetic layer 10a is provided on the first intermediate layer 30a. The functional layer 15a is provided on the first magnetic layer 10a. A cap layer 45 is provided on the functional layer 15a. On the other hand, as shown in FIG. 9A, the functional layer 15a is not provided in the second sample S02.

As can be seen from FIG. 8A, the second magnetic layer 20a is crystalline. Also the first intermediate layer 30a is crystalline. On the other hand, in the most part of the first magnetic layer 10a, a regular arrangement of atoms is not observed. That is, the first magnetic layer 10 is amorphous.

As shown in FIG. 8B, diffraction spots are observed in the diffraction image of point P1 corresponding to the second magnetic layer 20a. The diffraction spots are due to the fact that the second magnetic layer 20a has a crystal structure.

As shown in FIG. 8C, diffraction spots are observed in the diffraction image of point P2 corresponding to the first intermediate layer 30a. The diffraction spots are due to the fact that the intermediate layer 30 has a crystal structure.

On the other hand, as shown in FIG. 8D, distinct diffraction spots are not observed in the diffraction image of point P3 corresponding to the first magnetic layer 10a. In the diffraction image, a ring-like diffraction image reflecting an amorphous structure is observed. It is found that the first magnetic layer 10a of the first sample S01 includes an amorphous portion.

As can be seen from FIG. 9A, the second magnetic layer 20a and the first intermediate layer 30a are a crystal. Also the first magnetic layer 10a is crystalline.

As shown in FIG. 9B, diffraction spots due to a crystal structure are found in the diffraction image of the second magnetic layer 20a.

As shown in FIG. 9C, diffraction spots due to a crystal structure are found in the diffraction image of the first intermediate layer 30a.

As shown in FIG. 9D, diffraction spots due to a crystal structure are found also in the diffraction image of the first magnetic layer 10a. The result shows that the most part of the first magnetic layer 10a of the second sample S02 has a crystal structure.

A high gauge factor is obtained by using the first magnetic layer 10a including an amorphous portion, like the first sample S01 mentioned above.

Figure 10:
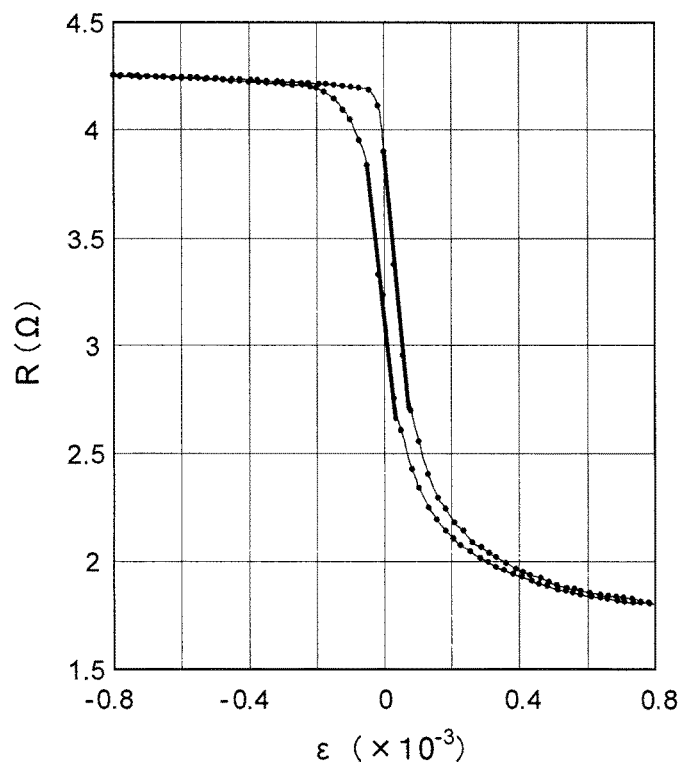
FIG. 10 is a graph showing characteristics of an inertial sensor.

FIG. 10 is a graph illustrating characteristics of an inertial sensor.

In this example, an FeB material of an amorphous structure (including a microcrystalline structure) is used for both the first magnetic layer 10a and the second magnetic layer 20a. From FIG. 10, the calculated gauge factor is 5290. Thus, a high gauge factor is obtained by using a magnetic layer of an amorphous structure.

When the first intermediate layer 30a is a metal, the GMR effect is exhibited, for example. When the first intermediate layer 30a is an insulator, the TMR effect is exhibited. In the sensing element unit 50, the CPP (current perpendicular to plane)-GMR effect in which a current is passed along the stacking direction of the resistance change unit is used, for example.

A CCP (current-confined-path) spacer layer may be used as the first intermediate layer 30a. In the CCP spacer layer, a metal current path with a width (for example, diameter) of 1 nm or more, approximately 5 nm, is formed in plural in a part of an insulating layer so as to penetrate in the film thickness direction. The CPP-GMR effect is used also in the CCP spacer layer.

Thus, in the embodiment, the inverse magnetostriction phenomenon in the sensing element unit 50 is used. Thereby, high-sensitivity sensing becomes possible. When the inverse magnetostriction effect is used, the magnetization direction of at least one of the first magnetic layer 10a and the second magnetic layer 20a changes with the strain applied from the outside, for example. The relative angle between the magnetizations of the two magnetic layers changes with the strain generated by acceleration (the presence or absence, the level thereof, etc.). Since the electric resistance changes with the strain generated by acceleration, the sensing element unit 50 functions as an inertial sensor.

Figures 11A, 11B:
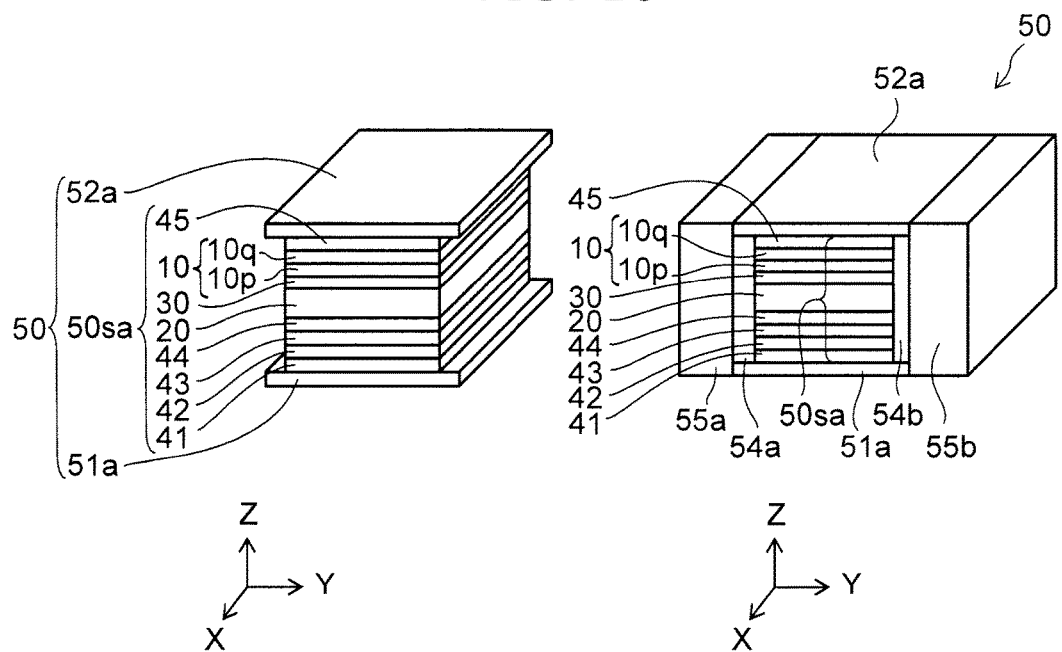
FIG. 11A and FIG. 11B are schematic perspective views showing part of the inertial sensor according to the first embodiment.

FIG. 11A and FIG. 11B are schematic perspective views illustrating part of the inertial sensor according to the first embodiment.

As shown in FIG. 11A, the sensing element unit 50 includes the first electrode 51a and the second electrode 52a, for example. The first resistance change unit 50sa is provided between the first electrode 51a and the second electrode 52a. In this example, in the first resistance change unit 50sa, a buffer layer 41, an antiferromagnetic layer 42, a magnetic layer 43, a Ru layer 44, the second magnetic layer 20a, the first intermediate layer 30a, the first magnetic layer 10a, and the cap layer 45 are provided in this order from the first electrode 51a side toward the second electrode 52a side.

The buffer layer 41 may serve also as a seed layer. The thickness of the buffer layer 41 is not less than 1 nm and not more than 10 nm, for example. As the buffer layer 41, an amorphous layer including Ta, Ti, or the line is used, for example. As the buffer layer 41, a layer of Ru, NiFe, or the like serving as a seed layer for the promotion of crystal orientation is used. A stacked film of these films may be used as the buffer layer 41. The thickness of the antiferromagnetic layer 42 is not less than 5 nm and not more than 10 nm, for example. The thickness of the magnetic layer 43 is not less than 2 nm and not more than 6 nm, for example. In this example, the thickness of the second magnetic layer 20a is not less than 2 nm and not more than 5 nm, for example. The thickness of the first intermediate layer 30a is not less than 1 nm and not more than 3 nm, for example. The thickness of the first magnetic layer 10a is not less than 2 nm and not more than 5 nm, for example. The thickness of the cap layer 45 is not less than 1 nm and not more than 5 nm, for example.

As the second magnetic layer 20a, also a magnetic stacked film may be used, for example. On the other hand, the first magnetic layer 10a may include a magnetic stacked film 10p for increasing the MR ratio and a high magnetostriction magnetic film 10q. The high magnetostriction magnetic film 10q is provided between the magnetic stacked film 10p and the cap layer 45. The magnetic stacked film 10p increases the MR ratio, for example. The thickness of the magnetic stacked film 10p is not less than 1 nm and not more than 3 nm, for example. For the magnetic stacked film 10p, an alloy including CoFe, CoFe, and the like are used, for example. The thickness of the high magnetostriction magnetic film 10q is not less than 1 nm and not more than 5 nm, for example.

For the first electrode 51a and the second electrode 52a, Au, Cu, Ta, Al, and the like, which are nonmagnetic materials, may be used, for example. As the first electrode 51a and the second electrode 52a, a soft magnetic material may be used; thereby, magnetic noise from the outside that influences the resistance change unit can be reduced. As the soft magnetic material, permalloy (NiFe alloy) and silicon steel (FeSi alloy) may be used, for example. The sensing element unit 50 is covered with an insulator such as an aluminum oxide (for example, $Al_2O_3$) and a silicon oxide (for example, $SiO_2$). Thereby, leakage current is suppressed.

The magnetization direction of at least one of the first magnetic layer 10a and the second magnetic layer 20a changes in accordance with the stress. The absolute value of the magnetostriction constant of at least one magnetic layer (the magnetic layer of which the magnetization direction changes in accordance with the stress) is preferably set to $10^{-5}$ or more, for example. Thereby, it becomes easier for the magnetization direction to change in accordance with the strain applied from the outside, due to the inverse magnetostriction effect. For at least one of the first magnetic layer 10a and the second magnetic layer 20a, a metal such as Fe, Co, and Ni, an alloy including them, or the like is used, for example. The magnetostriction constant is set large by the element used, additive elements, etc. The absolute value of the magnetostriction constant is preferably large. In view of materials that can be used as practical devices, absolute values of the magnetostriction constant of approximately $10^{-2}$ or less are practical.

As at least one of the first magnetic layer 10a and the second magnetic layer 20a, a magnetic layer of an amorphous structure including Fe is preferably used as a material by which a high strain sensitivity (gauge factor GF) is obtained, as described above, for example. In such a material, a GF of approximately 5,000 is obtained. It is presumed that a GF of approximately 10,000 can be obtained by optimization.

As the first intermediate layer 30a, an oxide such as MgO is used, for example. A magnetic layer on an MgO layer generally has a plus magnetostriction constant. In the case where the first magnetic layer 10a is formed on the first intermediate layer 30a, a stacked film of CoFeB/CoFe/NiFe is used as the first magnetic layer 10a, for example. When the uppermost NiFe layer is made Ni-rich, the absolute value of the magnetostriction constant of the NiFe layer is large in the minus. To suppress the cancellation of the plus magnetostriction on an oxide layer, the uppermost NiFe layer is not made Ni-rich as compared to the permalloy of $Ni_{81}Fe_{19}$ commonly used. Specifically, the ratio of Ni in the uppermost NiFe layer is preferably set less than 80 atomic percent (atomic %). In the case where a magnetization free layer is used as the first magnetic layer 10a, the thickness of the first magnetic layer 10a is preferably not less than 1 nm and not more than 20 nm, for example.

In the case where the first magnetic layer 10a is a magnetization free layer, the second magnetic layer 20a may be either a magnetization fixed layer or a magnetization free layer. In the case where the second magnetic layer 20a is a magnetization fixed layer, the magnetization direction of the second magnetic layer 20a does not change substantially even when a strain is applied from the outside. The electric resistance changes with the relative angle between the magnetizations of the first magnetic layer 10a and the second magnetic layer 20a. The presence or absence of strain is sensed by the difference in electric resistance. Thereby, the acceleration is sensed.

In the case where both the first magnetic layer 10a and the second magnetic layer 20a are a magnetization free layer, the magnetostriction constant of the first magnetic layer 10a is differentiated from the magnetostriction constant of the second magnetic layer 20a, for example.

In the case where the second magnetic layer 20a is either a magnetization fixed layer or a magnetization free layer, the thickness of the second magnetic layer 20a is preferably not less than 1 nm and not more than 20 nm, for example.

In the case where the second magnetic layer 20a is a magnetization fixed layer, a synthetic AF structure using a stacked structure of an antimagnetic layer/a magnetic layer/a Ru layer/a magnetic layer and the like may be used as the second magnetic layer 20a, for example. For the antimagnetic layer, IrMn and the like are used, for example. A hard bias layer may be provided.

A very small size is sufficient for the area necessary for the sensing element unit 50. In terms of the size of a square, the sensing element unit 50 needs only to have a size of 10 nm×10 nm to 20 nm×20 nm or more (one side×one side) as the minimum size, for example.

On the other hand, such a small element size increases the degree of difficulty in measures against antimagnetic fields because the element is operated as a sensor. When the element size is sufficiently smaller than the MEMS structure body, since the area to arrange elements is sufficient, in practical terms the element size is preferably increased so as to facilitate antimagnetic field measures and noise measures, for example. Examples of the element size are described below.

The area of the sensing element unit 50 is set sufficiently smaller than the area of the connection portion 74 that bends due to pressure. The area of the sensing element unit 50 is not more than ⅕ of the area of the planar shape of the weight portion 72, for example. The size of the weight portion 72 is approximately not less than 60 μm and not more than 600 μm, for example. When the diameter of the planar shape of the weight portion 72 is approximately 60 μm, the length of one side of the sensing element unit 50 is 12 μm or less, for example. When the diameter of the planar shape of the weight portion 72 is 600 μm, the length of one side of the sensing element unit 50 is 120 μm or less, for example.

As compared to the value of this upper limit, the size of the length of one side of not less than 10 nm and not more than 20 nm mentioned above is extremely small. Hence, in view of also the processing accuracy of the element etc., there is no need to make the sensing element unit 50 excessively small. Thus, the size of one side of the sensing element unit 50 is preferably set approximately not less than 0.5 μm and not more than 60 μm in practical terms, for example. If the element size is extremely small, the magnitude of the antimagnetic field generated in the sensing element unit 50 is increased; thus, the problem arises that the bias control of the sensing element unit 50 is difficult, or the like. When the element size is large, the problem of antimagnetic fields is not presented, and handling is thus easy in the engineering viewpoint. From this viewpoint, not less than 0.5 μm and not more than 60 μm are preferable sizes.

The length along the X-axis direction of the sensing element unit 50 is preferably not less than 0.5 μm and not more than 60 μm, for example. The length along the X-axis direction of the sensing element unit 50 is more preferably not less than 1 μm and not more than 20 μm.

The length along the Y-axis direction (the direction perpendicular to the X-axis direction and parallel to the X-Y plane) of the sensing element unit 50 is preferably not less than 0.5 μm and not more than 60 μm, for example. The length along the Y-axis direction of the sensing element unit 50 is more preferably in a range of not less than 1 μm and not more than 20 μm.

The thickness (length) along the Z-axis direction (the direction perpendicular to the X-Y plane) of the sensing element unit 50 is not less than 20 nm and not more than 100 nm, for example. The thickness is determined by the film thickness of the stacked films, for example.

The length along the X-axis direction of the sensing element unit 50 may be equal to or different from the length along the Y-axis direction of the sensing element unit 50. When the length along the X-axis direction of the sensing element unit 50 is different from the length along the Y-axis direction of the sensing element unit 50, shape magnetic anisotropy occurs. Thereby, effects similar to the effects obtained by a hard bias layer can be obtained.

The direction of the current passed through the sensing element unit 50 may be the direction from the first magnetic layer 10a toward the second magnetic layer 20a, or may be the direction from the second magnetic layer 20a toward the first magnetic layer 10a. The inertial sensor 310 according to the embodiment can provide an inertial sensor that senses acceleration, displacement, etc. with high sensitivity.

There is a piezoresistance inertial sensor using Si, for example. In this case, the strain sensitivity (gauge factor GF) is determined by the material used, and the gauge factor GF is approximately 130, for example. In the case of the piezoresistance inertial sensor using Si, an element area of approximately 100 μm in terms of one side is needed. The gauge factor GF per unit area is 130/100 μm², and is approximately $10^{10}$, for example.

On the other hand, in the inertial sensor according to the embodiment, a spin strain sensor is used as the sensing element unit 50. As described above, a gauge factor of approximately 4000 to 5000 is obtained. In the embodiment, higher gauge factors GF are obtained by using magnetic layers. Even a gauge factor GF of approximately 10,000 is obtained, for example. The element area necessary to achieve this gauge factor GF is approximately 100 nm in terms of one side, as described above. Accordingly, the gauge factor GF per unit area is approximately $10^{17}$, for example. Thus, in the embodiment, improvements in sensitivity per unit area of approximately seven digits are possible as compared to the case of the inertial sensor of a MEMS structure using Si, for example. In other words, sensitivities substantially equal to existing ones can be achieved even by small devices. Properties higher than conventional ones are obtained with sizes substantially equal to conventional ones. Properties such as high sensitivities, wide frequency ranges, and wide dynamic ranges are obtained, for example. The embodiment can provide an inertial sensor that has been difficult for conventional technology to provide.

As shown in FIG. 11B, the inertial sensor 50 may include bias layers 55a and 55b (hard bias layers). The bias layers 55a and 55b are provided to oppose a strain resistance change unit 50s.

In this example, the second magnetic layer 20 is a magnetization fixed layer. The bias layers 55a and 55b are juxtaposed to the second magnetic layer 20. The strain resistance change unit 50s is disposed between the bias layers 55a and 55b. An insulating layer 54a is provided between the bias layer 55a and the strain resistance change unit 50s. An insulating layer 54b is provided between the bias layer 55b and the strain resistance change unit 50s.

The bias layers 55a and 55b apply a bias magnetic field to the first magnetic layer 10. Thereby, the magnetization direction of the first magnetic layer 10 can be biased to an appropriate position, and can be made into a single magnetic domain.

The size (in this example, the length along the Y-axis direction) of each of the bias layers 55a and 55b is not less than 100 nm and not more than 10 μm, for example.

The size (in this example, the length along the Y-axis direction) of each of the insulating layers 54a and 54b is not less than 1 nm and not more than 5 nm, for example.

Second Embodiment

Figure 12:
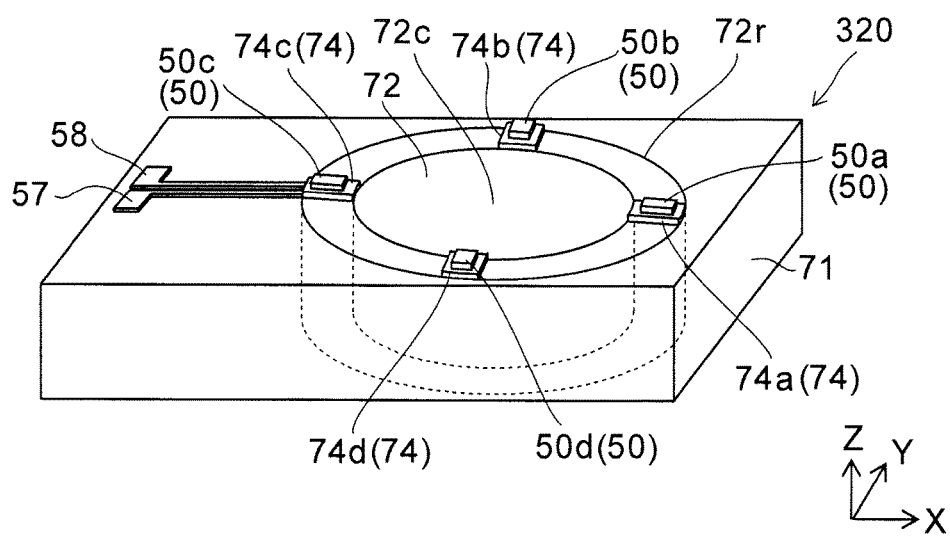
FIG. 12 is a schematic perspective view showing an inertial sensor according to a second embodiment.

FIG. 12 is a schematic perspective view illustrating an inertial sensor according to a second embodiment.

As shown in FIG. 12, in an inertial sensor 320, a second sensing element unit 50b is further provided in addition to the first sensing element unit 50a. That is, the connection portion 74 further includes a second portion 74b in addition to the first portion 74a. The second sensing element unit 50b is provided on the second portion 74b, for example. The second sensing element unit 50b is fixed to the second portion 74b.

In this example, a third sensing element unit 50c and a fourth sensing element unit 50d are further provided. That is, the connection portion 74 further includes a third portion 74c and a fourth portion 74d. The third sensing element unit 50c is provided on the third portion 74c. The third sensing element unit 50c is fixed to the third portion 74c. The fourth sensing element unit 50d is provided on the fourth portion 74d. The fourth sensing element unit 50d is fixed to the fourth portion 74d. The first to fourth sensing element units 50a to 50d are included in the sensing element unit 50. As described later, the number of sensing element units 50 may be 5 or more.

In this example, a first interconnection 57 and a second interconnection 58 are provided on the base portion 71. In this example, at least a part of the first interconnection 57 and the second interconnection 58 is provided on the upper surface of the base portion 71. The first interconnection 57 and the second interconnection 58 are electrically connected to each of the sensing element units 50.

In this example, the first to fourth portions 74a to 74d are apart from one another. That is, the connection portion 74 includes a plurality of portions apart from one another. In this example, the connection portion 74 holds a plurality of portions apart from one another of the weight portion 72.

As described later, the embodiment is not limited thereto, and the first to fourth portions 74a to 74d may be continuous. That is, the connection portion 74 may be continuously connected to the outer edge of the weight portion 72.

As shown in FIG. 12, the first to fourth sensing element units 50a to 50d are provided substantially in one plane. A plane parallel to the direction from the base portion 71 toward the weight portion 72 and to the direction from the first portion 74a toward the second portion 74b is formed, for example. In this example, the plane is the X-Y plane. In this example, the first to fourth sensing element units 50a to 50d are provided in the X-Y plane.

When projected onto the X-Y plane, the line connecting the centroid 72c of the weight portion 72 and the first sensing element unit 50a crosses the line connecting the centroid 72c of the weight portion 72 and the second sensing element unit 50b, for example. In this example, when projected onto the X-Y plane, the line connecting the first sensing element unit 50a and the third sensing element unit 50c passes through the centroid 72c of the weight portion 72. In this example, when projected onto the X-Y plane, the line connecting the second sensing element unit 50b and the fourth sensing element unit 50d passes through the centroid 72c of the weight portion 72.

The first to fourth sensing element units 50a to 50d are aligned along the outer edge 72c of the weight portion 72.

Figures 13A, 13B, 13C:
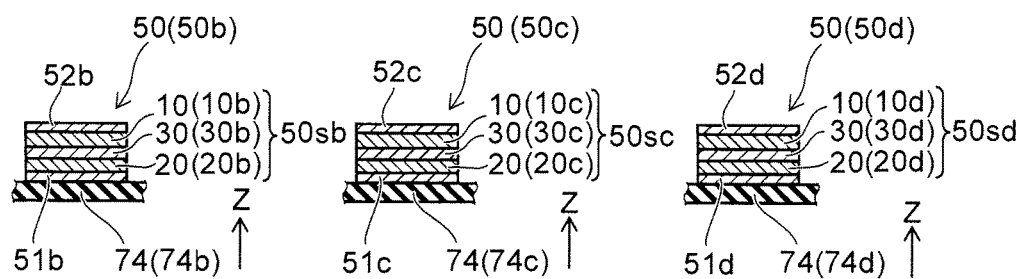
FIG. 13A to FIG. 13C are schematic cross-sectional views showing the inertial sensor according to the second embodiment.

FIG. 13A to FIG. 13C are schematic cross-sectional views illustrating the inertial sensor according to the second embodiment.

As shown in FIG. 13A, the second sensing element unit 50b includes a third magnetic layer 10b, a fourth magnetic layer 20b, and a second intermediate layer 30b. The second intermediate layer 30b is provided between the third magnetic layer 10b and the fourth magnetic layer 20b, and is nonmagnetic. The third magnetic layer 10b, the fourth magnetic layer 20b, and the second intermediate layer 30b are included in a second resistance change unit 50sb. In this example, a third electrode 51b and a fourth electrode 52b are further provided. The second resistance change unit 50sb is disposed between the third electrode 51b and the fourth electrode 52b. In this example, the third magnetic layer 10b is disposed between the third electrode 51b and the fourth electrode 52b, and the fourth magnetic layer 20b is disposed between the third magnetic layer 10b and the third electrode 51b.

As shown in FIG. 13B, the third sensing element unit 50c includes a fifth magnetic layer 10c, a sixth magnetic layer 20c, and a third intermediate layer 30c. The third intermediate layer 30c is provided between the fifth magnetic layer 10c and the sixth magnetic layer 20c, and is nonmagnetic. The fifth magnetic layer 10c, the sixth magnetic layer 20c, and the third intermediate layer 30c are included in a third resistance change unit 50sc. In this example, a fifth electrode 51c and a sixth electrode 52c are further provided. The third resistance change unit 50sc is disposed between the fifth electrode 51c and the sixth electrode 52c.

As shown in FIG. 13C, the fourth sensing element unit 50d includes a seventh magnetic layer 10d, an eighth magnetic layer 20d, and a fourth intermediate layer 30d. The fourth intermediate layer 30d is provided between the seventh magnetic layer 10d and the eighth magnetic layer 20d, and is nonmagnetic. The seventh magnetic layer 10d, the eighth magnetic layer 20d, and the fourth intermediate layer 30d are included in a fourth resistance change unit 50sd. In this example, a seventh electrode 51d and an eighth electrode 52d are further provided. The fourth resistance change unit 50sd is disposed between the seventh electrode 51d and the eighth electrode 52d.

The third magnetic layer 10b, the fifth magnetic layer 10c, and the seventh magnetic layer 10d are a magnetization free layer, for example. The material and configuration described in regard to the first magnetic layer 10a are used for these magnetic layers.

The fourth magnetic layer 20b, the sixth magnetic layer 20c, and the eighth magnetic layer 20d are a reference layer, for example. These magnetic layers are a magnetization free layer or a magnetization fixed layer, for example. The material and configuration described in regard to the second magnetic layer 20a are used for these magnetic layers.

Figure 14A:
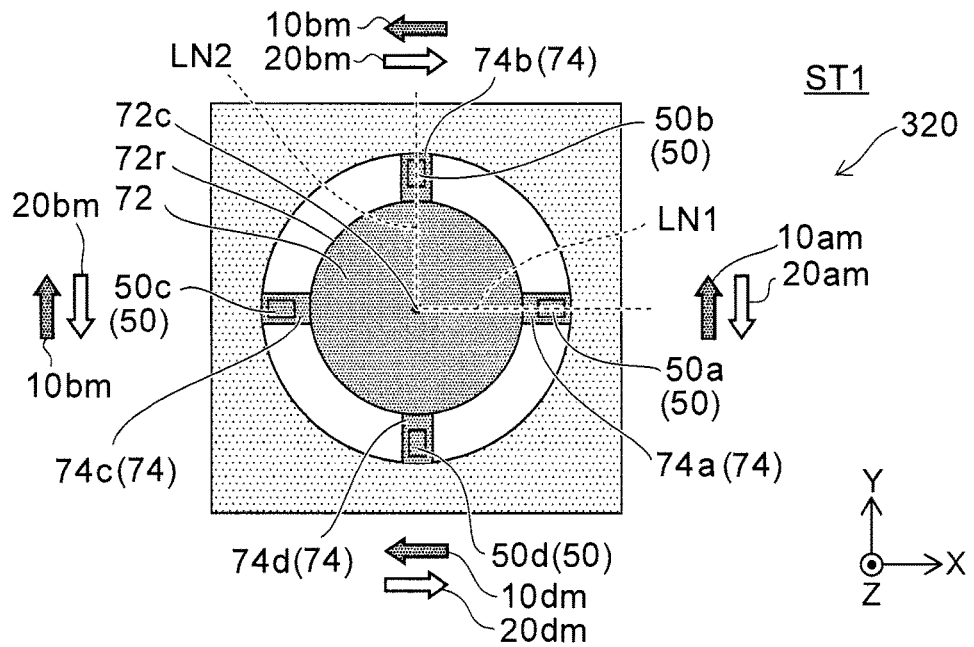
FIG. 14A and FIG. 14B are schematic plan views showing the inertial sensor according to the second embodiment.
Figure 14B:
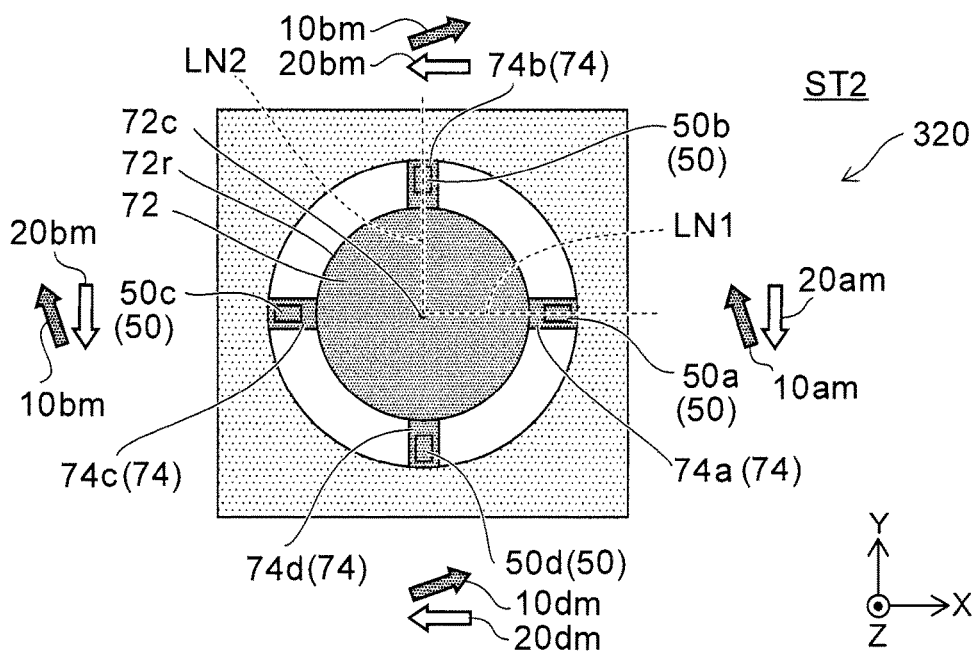

FIG. 14A and FIG. 14B are schematic plan views illustrating the inertial sensor according to the second embodiment.

FIG. 14A and FIG. 14B correspond to the first state ST1 and the second state ST2, respectively.

As shown in FIG. 14A, one plane (for example, the X-Y plane) includes the direction from the base portion 71 toward the weight portion 72 and the direction from the first portion 74a toward the second portion 74b. The direction connecting the position of the centroid 72c of the weight portion 72 in the plane (the X-Y plane) and the position of the first portion 74a in the plane is defined as a first direction LN1, for example. On the other hand, the direction connecting the position of the centroid 72c of the weight portion 72 in the plane and the position of the second portion 74b in the plane is defined as a second direction LN2. The first direction LN1 crosses the second direction LN2. In this example, the angle between the first direction LN1 and the second direction LN2 is substantially 90 degrees. This angle is larger than 0 degrees and smaller than 180 degrees, for example.

When projected onto the X-Y plane, a plurality of sensing element units 50 are arranged along the circumference of a circle with center at the centroid 72c of the weight portion 72.

In the first state ST1, in the first sensing element unit 50a, the direction of the magnetization of the first magnetic layer 10a (a first layer magnetization direction 10am) runs along the direction of the magnetization of the second magnetic layer 20a (a second layer magnetization direction 20am), for example. In this example, the first layer magnetization direction 10am is antiparallel to the second layer magnetization direction 20am.

In the first state ST1, in the second sensing element unit 50b, the direction of the magnetization of the third magnetic layer 10b (a third layer magnetization direction 10bm) runs along the direction of the magnetization of the fourth magnetic layer 20b (a fourth layer magnetization direction 20bm), for example. In this example, the third layer magnetization direction 10bm is antiparallel to the fourth layer magnetization direction 20bm.

In the first state ST1, in the third sensing element unit 50c, the direction of the magnetization of the fifth magnetic layer 10c (a fifth layer magnetization direction 10cm) runs along the direction of the magnetization of the sixth magnetic layer 20c (a sixth layer magnetization direction 20cm), for example. In this example, the fifth layer magnetization direction 10cm is antiparallel to the sixth layer magnetization direction 20cm.

In the first state ST1, in the fourth sensing element unit 50d, the direction of the magnetization of the seventh magnetic layer 10d (a seventh layer magnetization direction 10dm) runs along the direction of the magnetization of the eighth magnetic layer 20d (an eighth layer magnetization direction 20dm), for example. In this example, the seventh layer magnetization direction 10dm is antiparallel to the eighth layer magnetization direction 20dm.

For easier description, it is assumed that the reference layer 20 (the second magnetic layer 20a, the fourth magnetic layer 20b, the sixth magnetic layer 20c, the eighth magnetic layer 20d, and the like) is a magnetization fixed layer.

The direction of the magnetization of the second magnetic layer 20a (the second layer magnetization direction 20am) crosses the direction of the magnetization of the fourth magnetic layer 20b (the fourth layer magnetization direction 20bm). The angle between the second layer magnetization direction 20am and the fourth layer magnetization direction 20bm is 90 degrees, for example.

In this example, the direction of the magnetization of the sixth magnetic layer 20c (the sixth layer magnetization direction 20cm) is parallel to the direction of the magnetization of the second magnetic layer 20a (the second layer magnetization direction 20am). The direction of the magnetization of the eighth magnetic layer 20d (the eighth layer magnetization direction 20dm) is parallel to the direction of the magnetization of the fourth magnetic layer 20b (the fourth layer magnetization direction 20bm).

As shown in FIG. 14B, on entering the second state ST2, the direction of the magnetization of the magnetization free layer 10 (the first magnetic layer 10a, the third magnetic layer 10b, the fifth magnetic layer 10c, the seventh magnetic layer 10d, and the like) changes from that in the first state ST1.

As shown in FIG. 14A, in the first magnetic layer 10a, when the relative position of the weight portion 72 with respect to the base portion 71 is in the first state ST1, the magnetization of the first magnetic layer 10a (the first layer magnetization direction 10am) is in a first magnetization direction, for example. In this example, the first magnetization direction in the first state ST1 (the first layer magnetization direction 10am) runs along the Y-axis direction. As shown in FIG. 14B, when the relative position of the weight portion 72 with respect to the base portion 71 is in the second state ST2 different from the first state ST1, the magnetization of the first magnetic layer 10a (the first layer magnetization direction 10am) is in a direction different from the first magnetization direction in the first state ST1. In this example, the magnetization of the first magnetic layer 10a (the first layer magnetization direction 10am) in the second state ST2 is inclined with respect to the Y-axis direction. Thereby, in the first sensing element unit 50a, the electric resistance changes between the first state ST1 and the second state ST2.

Similarly, as shown in FIG. 14A, in the second sensing element unit 50b, when the relative position of the weight portion 72 with respect to the base portion 71 is in the first state ST1, the magnetization of the third magnetic layer 10b (the third layer magnetization direction 10bm) is in a third magnetization direction. In this example, the third magnetization direction in the first state ST1 (the third layer magnetization direction 10bm) runs along the X-axis direction. As shown in FIG. 14B, when the relative position of the weight portion 72 with respect to the base portion 71 is in the second state ST2, the magnetization of the third magnetic layer 10b (the third layer magnetization direction 10bm) is in a direction different from the third magnetization direction in the first state ST1. In this example, the magnetization of the third magnetic layer 10b (the third layer magnetization direction 10bm) in the second state ST2 is inclined with respect to the X-axis direction. Thereby, in the second sensing element unit 50b, the electric resistance changes between the first state ST1 and the second state ST2.

In the inertial sensor 320, with the centroid 72c of the weight portion 72 as a reference, a plurality of sensing element units 50 are arranged in different directions. Thereby, accelerations in different directions can be sensed. With the centroid 72c of the weight portion 72 as a reference, the direction of the magnetization of the reference layer (the second magnetic layer 20a) in the first sensing element unit 50a disposed in the X-axis direction and the direction of the magnetization of the reference layer (the fourth magnetic layer 20b) in the second sensing element unit 50b disposed in the Y-axis direction cross each other; thereby, accelerations along the X-axis direction and accelerations along the Y-axis direction can be sensed, for example. Also accelerations along the Z-axis direction can be sensed. The inertial sensor 320 can sense accelerations in arbitrary directions of three axes.

In the case where the reference layer 20 is a magnetization fixed layer, the direction of the magnetization of each of the plurality of reference layers 20 may be set in accordance with the positioning of each of the plurality of reference layers 20. As shown in FIG. 14A, in this example, the angle between the first direction LN1 and the second direction LN2 is 90 degrees. At this time, the angle between the direction of the magnetization of the second magnetic layer 20a and the direction of the magnetization of the fourth magnetic layer 20b is 90 degrees. It is assumed that, when the angle between the first direction LN1 and the second direction LN2 is not less than 70 degrees and not more than 110 degrees, the angle between the direction of the magnetization of the second magnetic layer 20a and the direction of the magnetization of the fourth magnetic layer 20b is not less than 70 degrees and not more than 110 degrees, for example. The properties in the sensing element units 50 are substantially symmetric, and sensing sensitivity can be enhanced.

Although this example is described for the case where the reference layer 20 is a magnetization fixed layer, the reference layer 20 may be a magnetization free layer. In this case, when the relative position of the weight portion 72 with respect to the base portion 71 is in the first state ST1, the magnetization of the first magnetic layer 10a is in a first magnetization direction, and the magnetization of the second magnetic layer 20a is in a second magnetization direction, for example. When the relative position of the weight portion 72 with respect to the base portion 71 is in the second state ST2 different from the first state ST1, the magnetization of the first magnetic layer 10a is in a direction different from the first magnetization direction, and the magnetization of the second magnetic layer 20a is in a direction different from the second magnetization direction. Thereby, in the first sensing element unit 50a, the electric resistance changes between the first state ST1 and the second state ST2.

On the other hand, when the relative position of the weight portion 72 with respect to the base portion 71 is in the first state ST1, the magnetization of the third magnetic layer 10b is in a third magnetization direction, and the magnetization of the fourth magnetic layer 20b is in a fourth magnetization direction. When the relative position of the weight portion 72 with respect to the base portion 71 is in the second state ST2, the magnetization of the third magnetic layer 10b is in a direction different from the third magnetization direction, and the magnetization of the fourth magnetic layer 20b is in a direction different from the fourth magnetization direction. Thereby, in the second sensing element unit 50b, the electric resistance changes between the first state ST1 and the second state ST2.

Thus, each of the sensing element units 50 is provided in each of the plurality of positions of the connection portion 74 (for example, the first portion 74a and the second portion 74b). In the case where a magnetization fixed layer is used as the reference layer 20, the direction of the magnetization of the second magnetic layer 20a in the first sensing element unit 50a and the direction of the magnetization of the fourth magnetic layer 20b in the second sensing element unit 50b may be differentiated from each other; thereby, accelerations in the directions of three axes are sensed. Alternatively, by using a magnetization free layer as the reference layer 20, accelerations in the directions of three axes are sensed.

Figure 15A:
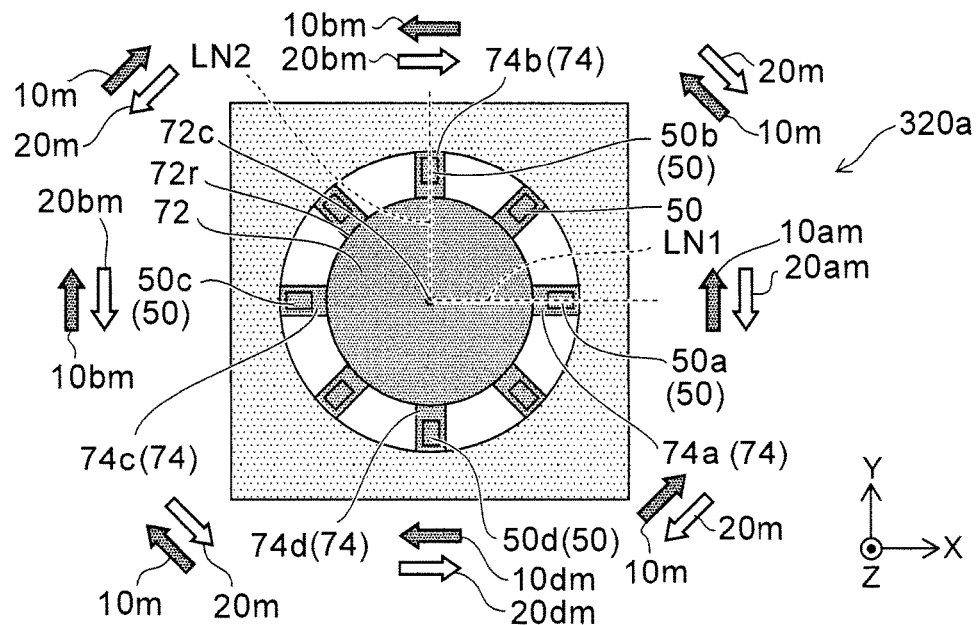
FIG. 15A and FIG. 15B are schematic plan views showing other inertial sensors according to the second embodiment.
Figure 15B:
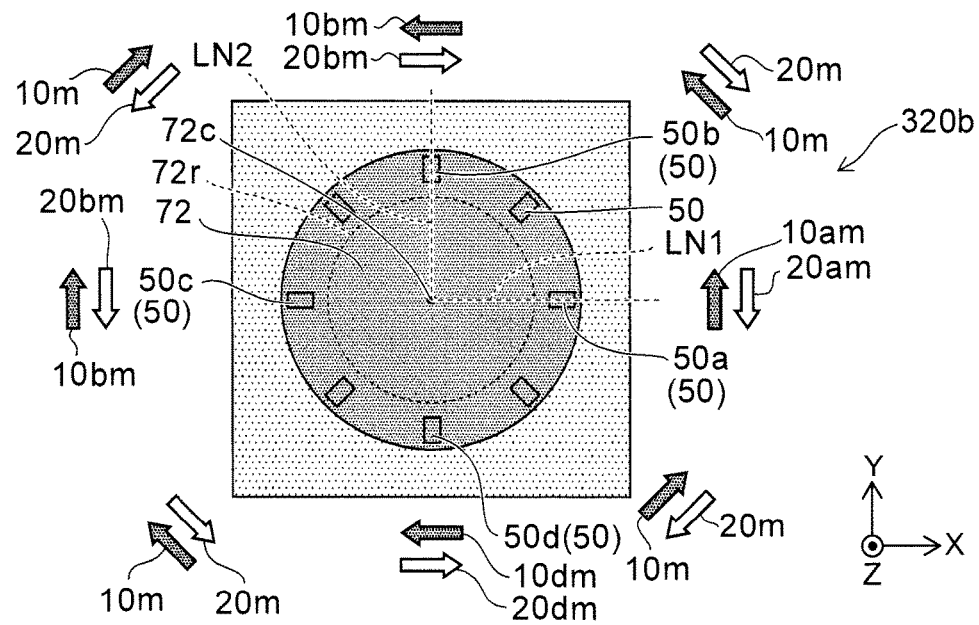

FIG. 15A and FIG. 15B are schematic plan views illustrating other inertial sensors according to the second embodiment.

As shown in FIG. 15A, in an inertial sensor 320a according to the embodiment, a plurality of sensing element units 50 are provided. In this example, the number of sensing element units 50 is eight. In the embodiment, the number of sensing element units 50 is arbitrary.

In this example, the magnetization 20m of the reference layer 20 of each of the sensing element units 50 is orthogonal to the line connecting each sensing element unit 50 and the centroid 72c of the weight portion 72. The magnetization 10m of the magnetization free layer 10 of each of the sensing element units 50 is substantially parallel (in this example, antiparallel) to the magnetization 20m of the reference layer 20 of each sensing element unit 50.

In the embodiment, the angle with the line connecting the magnetization 20m of the reference layer 20 of each of the sensing element units 50 and the centroid 72c of the weight portion 72 may be altered from 90 degrees. The angle between the magnetization 10m of the magnetization free layer 10 of each of the sensing element units 50 and the magnetization 20m of the reference layer 20 of each sensing element unit 50 may be altered from 0 degrees or 180 degrees.

As shown in FIG. 15B, in an inertial sensor 320b according to the embodiment, the connection portion 74 is continuous, and the first portion 74a is continuous with the second portion 74b, for example.

In the embodiment, when the first portion 74a and the second portion 74b are separated, the degree of deformation of the connection portion 74 with respect to the applied acceleration is increased, and sensing sensitivity is enhanced. On the other hand, when the connection portion 74 is continuous, the mechanical strength of the connection portion 74 is enhanced. The connection portion 74 is designed in accordance with the thickness of the connection portion 74, the necessary sensing sensitivity, and the viewpoint of reliability.

When the connection portion 74 is thin, high sensing sensitivity is obtained, for example. The X-Y plane is a plane parallel to the direction from the base portion 71 toward the weight portion 72 and to the direction from the first portion 74a toward the second portion 74b, for example. The direction perpendicular to the X-Y plane (for example, the Z-axis direction) is defined as a third direction. The length (thickness) of the first portion 74a along the third direction is shorter (thinner) than the length (thickness) of the weight portion 72 along the third direction (the Z-axis direction). The length (thickness) of the second portion 74b along the third direction (the Z-axis direction) is shorter (thinner) than the length (thickness) of the weight portion 72 along the third direction (the Z-axis direction).

The width of the first portion 74a and the width of the second portion 74b are narrower than the width of the weight portion 72. The first portion 74a and the second portion 74b are separated from each other, for example. At this time, the direction parallel to the X-Y plane and perpendicular to the first direction LN1 is defined as a fourth direction. The length (width) of the first portion 74a along the fourth direction is shorter than the length (width) of the weight portion 72 along the fourth direction. On the other hand, the direction parallel to the X-Y plane and perpendicular to the second direction LN2 is defined as a fifth direction. The length (width) of the second portion 74b along the fifth direction is shorter than the length (width) of the weight portion 72 along the fifth direction. Thereby, it becomes easier to obtain high sensing sensitivity.

Third Embodiment

Figure 16A:
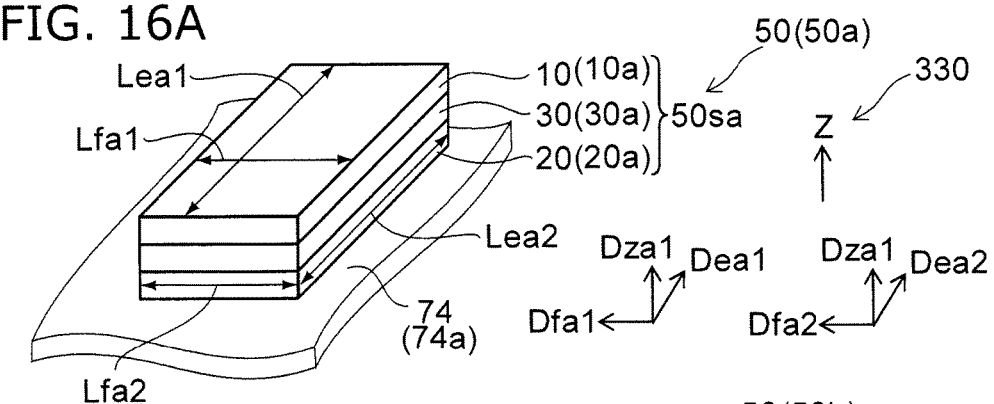
FIG. 16A and FIG. 16B are schematic perspective views showing an inertial sensor according to a third embodiment.
Figure 16B:
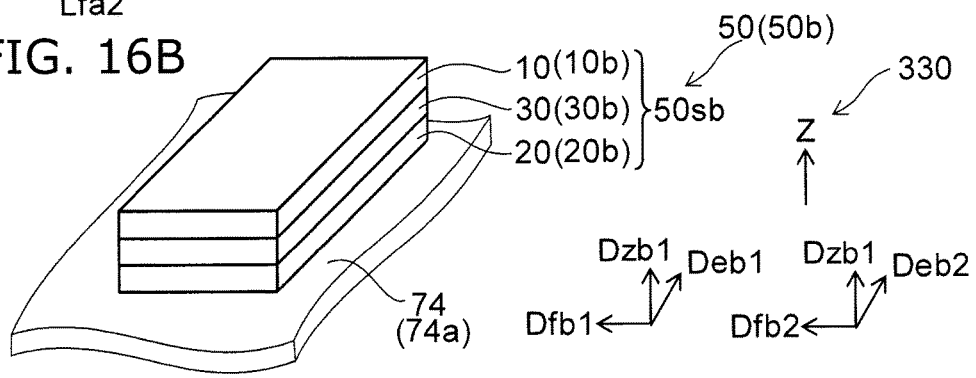

FIG. 16A and FIG. 16B are schematic perspective views illustrating an inertial sensor according to a third embodiment.

FIG. 16A illustrates the first sensing element unit 50a in an inertial sensor 330 according to the embodiment. FIG. 16B illustrates the second sensing element unit 50b in the inertial sensor 330. In the drawings, the base portion 71 and the weight portion 72 are omitted. The base portion 71 and the weight portion 72 in the inertial sensor 330 are similar to those described in regard to the first and second embodiments, for example.

As shown in FIG. 16A, the first magnetic layer 10a extends along a first extending direction Dea1. The first extending direction Dea1 crosses a first stacking direction Dza1 from the first magnetic layer 10a toward the second magnetic layer 20a (for example, the Z-axis direction). In this example, the first extending direction Dea1 is perpendicular to the first stacking direction Dza1. The first magnetic layer 10a has a length along the first extending direction Dea1 (a first major axis length Lea1). The first magnetic layer 10a has a length in a direction (direction Dfa1) crossing the first stacking direction Dza1 and crossing the first extending direction Dea1 (a first minor axis length Lfa1). The first major axis length Lea1 of the first magnetic layer 10a is longer than the first minor axis length Lfa1 of the first magnetic layer 10a.

The second magnetic layer 20a extends along a second extending direction Dea2. The second extending direction Dea2 crosses the first stacking direction Dza1 from the first magnetic layer 10a toward the second magnetic layer 20a (for example, the Z-axis direction). In this example, the second extending direction Dea2 is perpendicular to the first stacking direction Dza1. The second magnetic layer 20a has a length along the second extending direction Dea2 (a second major axis length Lea2). The second magnetic layer 20a has a length in a direction (direction Dfa2) crossing the first stacking direction Dza1 and crossing the second extending direction Dea2 (a second minor axis length Lfa2). The second major axis length Lea2 of the second magnetic layer 20a is longer than the second minor axis length Lfa2 of the second magnetic layer 20a.

That is, shape anisotropy is provided in the first sensing element unit 50a. In this example, the second extending direction Dea2 runs along the first extending direction Dea1. The extending direction of the second magnetic layer 20a (the second extending direction Dea2) is parallel to the extending direction of the first magnetic layer 10a (the first extending direction Dea1), for example.

The first major axis length Lea1 (the length of the first magnetic layer 10a in the first extending direction Dea1) is not less than 1.5 times and not more than 3 times the first minor axis length Lfa1 (the length of the first magnetic layer 10a in the direction Dfa1 crossing the first stacking direction Dza1 and crossing the first extending direction Dea1), for example.

The second major axis length Lea2 (the length of the second magnetic layer 20a in the second extending direction Dea2) is not less than 1.5 times and not more than 3 times the second minor axis length Lfa2 (the length of the second magnetic layer 20a in the direction Dfa2 crossing the first stacking direction Dza1 and crossing the second extending direction Dea2), for example.

As shown in FIG. 16B, the third magnetic layer 10b extends along a third extending direction Deb1. The third extending direction Deb1 crosses a second stacking direction Dzb1 from the third magnetic layer 10b toward the fourth magnetic layer 20b (for example, the Z-axis direction). In this example, the third extending direction Deb1 is perpendicular to the second stacking direction Dzb1. The third magnetic layer 10b has a length along the third extending direction Deb1 (a third major axis length Leb1). The third magnetic layer 10b has a length in the direction (direction Dfb1) crossing the second stacking direction Dzb1 and crossing the third extending direction Deb1 (a third minor axis length Lfb1). The third major axis length Leb1 of the third magnetic layer 10b is longer than the third minor axis length Lfb1 of the third magnetic layer 10b.

The fourth magnetic layer 20b extends along a fourth extending direction Deb2. The fourth extending direction Deb2 crosses the second stacking direction Dzb1 from the third magnetic layer 10b toward the fourth magnetic layer 20b (for example, the Z-axis direction). In this example, the fourth extending direction Deb2 is perpendicular to the second stacking direction Dzb1. The fifth magnetic layer 20b has a length along the fourth extending direction Deb2 (a fourth major axis length Leb2). The fourth magnetic layer 20b has a length in the direction (direction Dfb2) crossing the second stacking direction Dzb1 and crossing the fourth extending direction Deb2 (a fourth minor axis length Lfb2). The fourth major axis length Leb2 of the fourth magnetic layer 20b is longer than the fourth minor axis length Lfb2 of the fourth magnetic layer 20b.

That is, shape anisotropy is provided in the second sensing element unit 50b. In this example, the fourth extending direction Deb2 runs along the third extending direction Deb1. The extending direction of the fourth magnetic layer 20b (the fourth extending direction Deb2) is parallel to the extending direction of the third magnetic layer 10b (the third extending direction Deb1), for example.

The third major axis length Leb1 (the length of the third magnetic layer 10b in the third extending direction Deb1) is not less than 1.5 times and not more than 3 times the third minor axis length Lfb1 (the length of the third magnetic layer 10b in the direction Dfb1 crossing the second stacking direction Dzb1 and crossing the third extending direction Deb1), for example.

The fourth major axis length Leb2 (the length of the fourth magnetic layer 20b in the fourth extending direction Deb2) is not less than 1.5 times and not more than 3 times the fourth minor axis length Lfb2 (the length of the fourth magnetic layer 20b in the direction Dfb2 crossing the second stacking direction Dzb1 and crossing the fourth extending direction Deb2), for example.

Each of the first major axis length Lea1, the second major axis length Lea2, the third major axis length Leb1, and the fourth major axis length Leb2 is not less than 0.5 µm and not more than 60 µm, for example.

By providing shape anisotropy in the first sensing element unit 50a and the second sensing element unit 50b and differentiating the direction of shape anisotropy (extending direction), the direction of the magnetization of the reference layer 20 (the second magnetic layer 20a) of the first sensing element unit 50a and the direction of the magnetization of the reference layer 20 (the fourth magnetic layer 20b) of the second sensing element unit 50b can be differentiated from each other.

Figure 17:
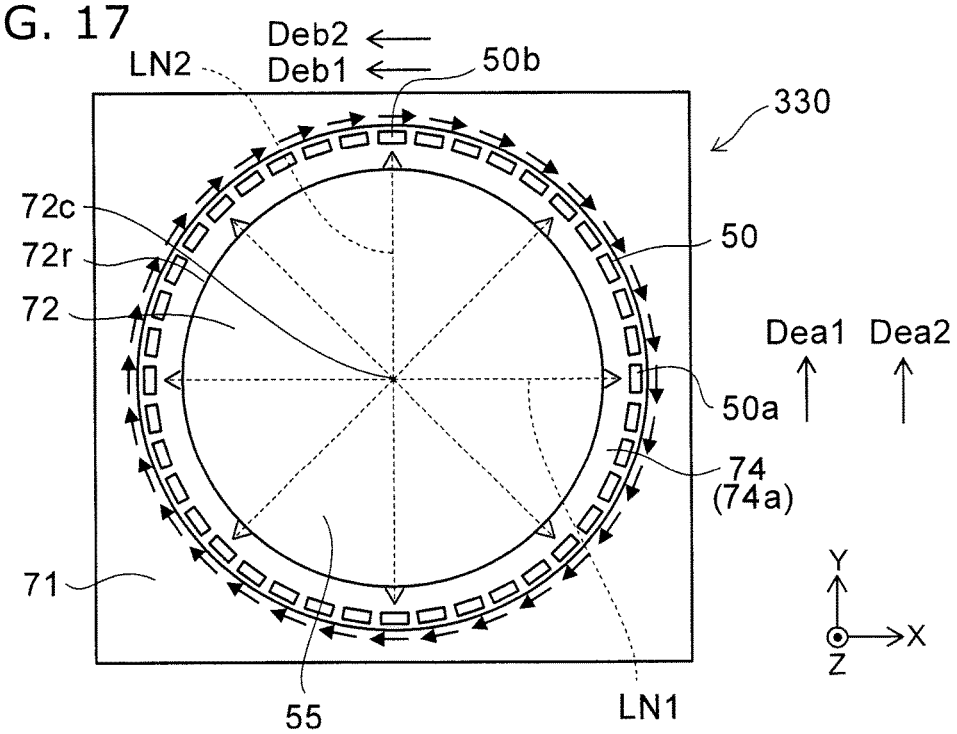
FIG. 17 is a schematic plan view showing the inertial sensor according to the third embodiment.

FIG. 17 is a schematic plan view illustrating the inertial sensor according to the third embodiment.

In FIG. 17, for easier viewing of the drawing, the boundary between portions provided in the connection portion 74 (the first portion 74a, the second portion 74b, etc.) is omitted.

As shown in FIG. 17, in the inertial sensor 330 according to the embodiment, a plurality of sensing element units 50 (the first sensing element unit 50a, the second sensing element unit 50b, etc.) are provided. The plurality of sensing element units 50 are provided along the outer edge 72r of the weight portion 72, for example.

In the first sensing element unit 50a, the first extending direction Dea1 and the second extending direction Dea2 run along the Y-axis direction, for example.

In the second sensing element unit 50b, the third extending direction Deb1 and the fourth extending direction Deb2 run along the X-axis direction, for example.

Thus, the first extending direction Dea1 of the first magnetic layer 10a of the first sensing element unit 50a crosses the third extending direction Deb1 of the third magnetic layer 10b of the second sensing element unit 50b. The second extending direction Dea1 of the second magnetic layer 20a of the first sensing element unit 50a crosses the fourth extending direction Deb2 of the fourth magnetic layer 20b of the second sensing element unit 50b.

In the inertial sensor 330, the direction of the magnetization of each of the plurality of magnetic layers can be controlled using shape anisotropy. Thereby, a sensing element unit 50 having desired characteristics can be provided in a desired position of the connection portion 74. Thereby, sensing with higher sensitivity becomes possible.

In this example, the shape of the weight portion 72 when projected onto the X-Y plane is a circle. The direction 55 of the stress generated when an acceleration 72g is applied to the weight portion 72 runs along the radial line with center at the centroid 72c of the weight portion 72, for example. The extending direction of the magnetic layer is set so as to cross the direction 55 of the stress, for example. The extending direction of the magnetic layer crosses the radial line with center at the centroid 72c of the weight portion 72, for example. The first extending direction Dea1 crosses the line passing through the centroid 72c and the first magnetic layer 10a, for example. The angle between the first extending direction Dea1 and the line passing through the centroid 72c and the first magnetic layer 10a is not less than 70 degrees and not more than 110 degrees, for example, and is approximately 90 degrees, for example.

The angle from the first direction LN1 to the first extending direction Dea1 is substantially equal to the angle from the second direction LN2 to the third extending direction Deb1, for example. The difference between the angle from the first direction LN1 to the first extending direction Dea1 and the angle from the second direction LN2 to the third extending direction Deb1 is 10 degrees or less.

Figure 18A:
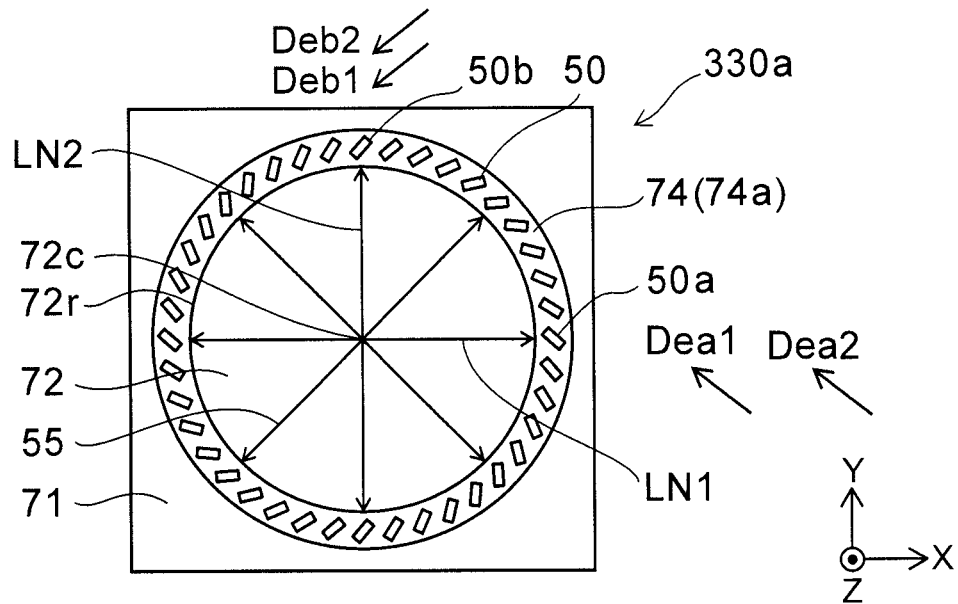
FIG. 18A and FIG. 18B are schematic plan views showing other inertial sensors according to the third embodiment.
Figure 18B:
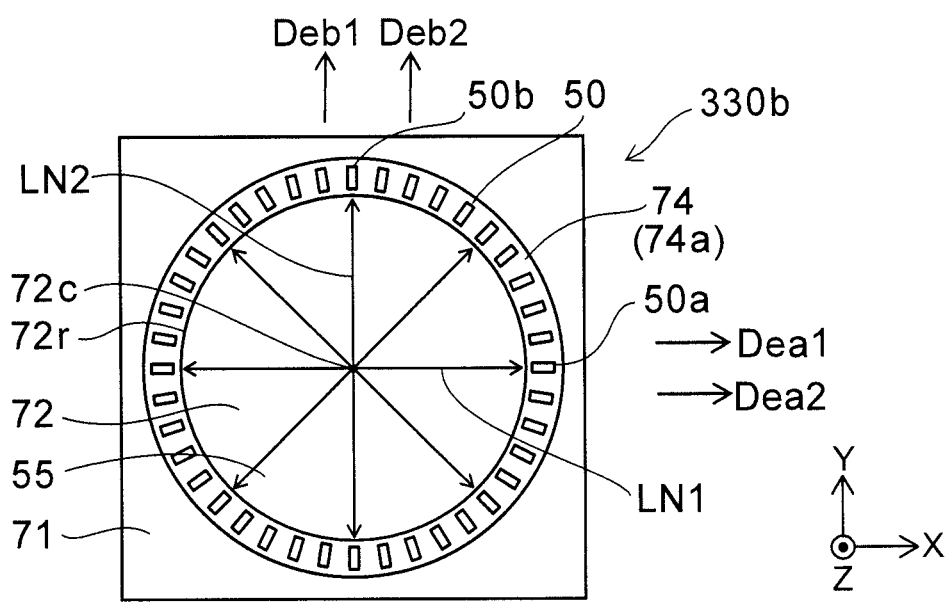

FIG. 18A and FIG. 18B are schematic plan views illustrating other inertial sensors according to the third embodiment.

In the drawings, for easier viewing of the drawings, the boundary between portions provided in the connection portion 74 (the first portion 74a, the second portion 74b, etc.) is omitted.

As shown in FIG. 18A and FIG. 18B, also in inertial sensors 330a and 330b according to the embodiment, a plurality of sensing element units 50 (the first sensing element unit 50a, the second sensing element unit 50b, etc.) are provided.

As shown in FIG. 18A, in the inertial sensor 330a, the extending direction of the magnetic layer is inclined with respect to the radial line with center at the centroid 72c of the weight portion 72. The angle between the first extending direction Dea1 and the line passing through the centroid 72c and the first magnetic layer 10a is larger than 0 degrees and smaller than 90 degrees, for example. The difference between the angle from the first direction LN1 to the first extending direction Dea1 and the angle from the second direction LN2 to the third extending direction Deb1 is 10 degrees or less, for example.

As shown in FIG. 18B, in the inertial sensor 330b, the extending direction of the magnetic layer runs along the radial line with center at the centroid 72c of the weight portion 72. The angle between the first extending direction Dea1 and the line passing through the centroid 72c and the first magnetic layer 10a is plus or minus 5 degrees or less, for example.

Also such inertial sensors can sense acceleration and displacement with high sensitivity.

Figure 19:
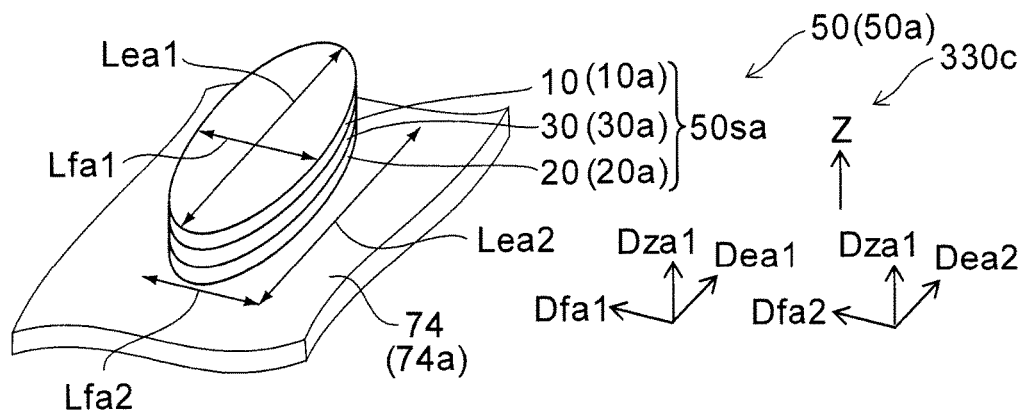
FIG. 19 is a schematic perspective view showing another inertial sensor according to the third embodiment.

FIG. 19 is a schematic perspective view illustrating another inertial sensor according to the third embodiment.

FIG. 19 illustrates the first sensing element unit 50a in another inertial sensor 330c according to the embodiment. In FIG. 19, the base portion 71 and the weight portion 72 are omitted. The base portion 71 and the weight portion 72 in the inertial sensor 330c are similar to those described in regard to the first and second embodiments, for example.

As shown in FIG. 19, in the first sensing element unit 50a, the planar shape of the first magnetic layer 10a, the second magnetic layer 20a, and the first intermediate layer 30a (the shape when projected onto the X-Y plane) is a flat circular shape (including an ellipse). Similarly, also the planar shape of each of the magnetic layers provided in the second sensing element unit 50b may be a flat circular shape.

Figures 20A, 20B:
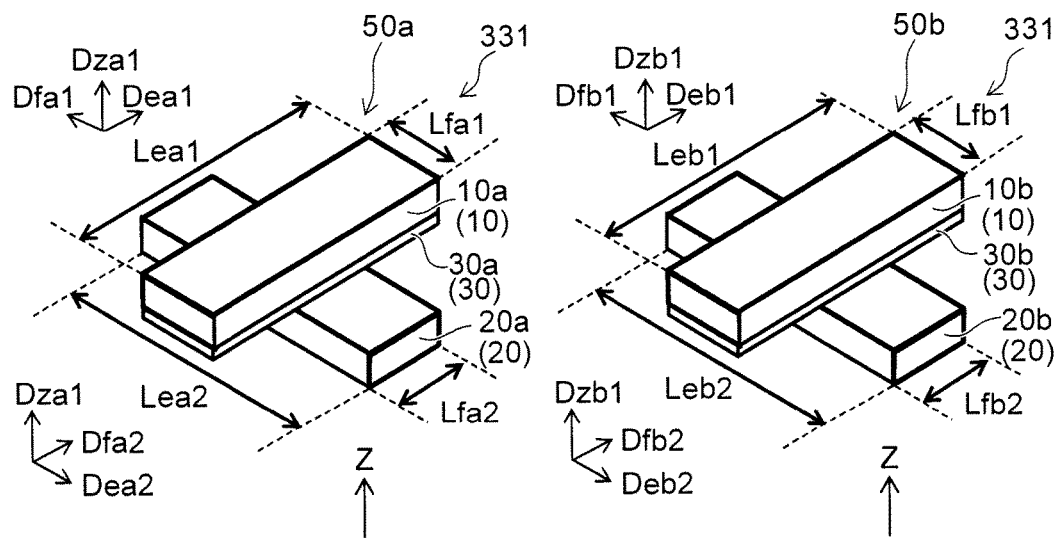
FIG. 20A and FIG. 20B are schematic perspective views showing another inertial sensor according to the third embodiment.

FIG. 20A and FIG. 20B are schematic perspective views illustrating another inertial sensor according to the third embodiment.

FIG. 20A illustrates the first sensing element unit 50a in an inertial sensor 331 according to the embodiment. FIG. 20B illustrates the second sensing element unit 50b in the inertial sensor 331. In the drawings, the base portion 71, the weight portion 72, and the connection portion 74 are omitted. The base portion 71, the weight portion 72, and the connection portion 74 in the inertial sensor 331 are similar to those described in regard to the inertial sensor 330, for example.

As shown in FIG. 20A and FIG. 20B, in this example, the extending direction of the magnetization free layer 10 and the extending direction of the reference layer 20 cross each other.

As shown in FIG. 20A, the first magnetic layer 10a extends along the first extending direction Dea1, for example. The second magnetic layer 20a extends along the second extending direction Dea2. The second extending direction Dea2 crosses the first extending direction Dea1.

As shown in FIG. 20B, the third magnetic layer 10b extends along the third extending direction Deb1, for example. The fourth magnetic layer 20b extends along the fourth extending direction Deb2. The fourth extending direction Deb2 crosses the third extending direction Deb1.

That is, in the inertial sensor 331, the direction of the shape anisotropy provided for the first magnetic layer 10a is different from the direction of the shape anisotropy provided for the second magnetic layer 20a. The direction of the shape anisotropy provided for the third magnetic layer 10b is different from the direction of the shape anisotropy provided for the fourth magnetic layer 20b. The direction of the magnetization based on the shape anisotropy of the first magnetic layer 10a can be differentiated from the direction of the magnetization based on the shape anisotropy of the second magnetic layer 20a, for example. The direction of the magnetization based on the shape anisotropy of the third magnetic layer 10b can be differentiated from the direction of the magnetization based on the shape anisotropy of the fourth magnetic layer 20b, for example. Thereby, a sensing element unit 50 having desired magnetization directions is obtained. Sensing with higher sensitivity becomes possible.

Figure 21:
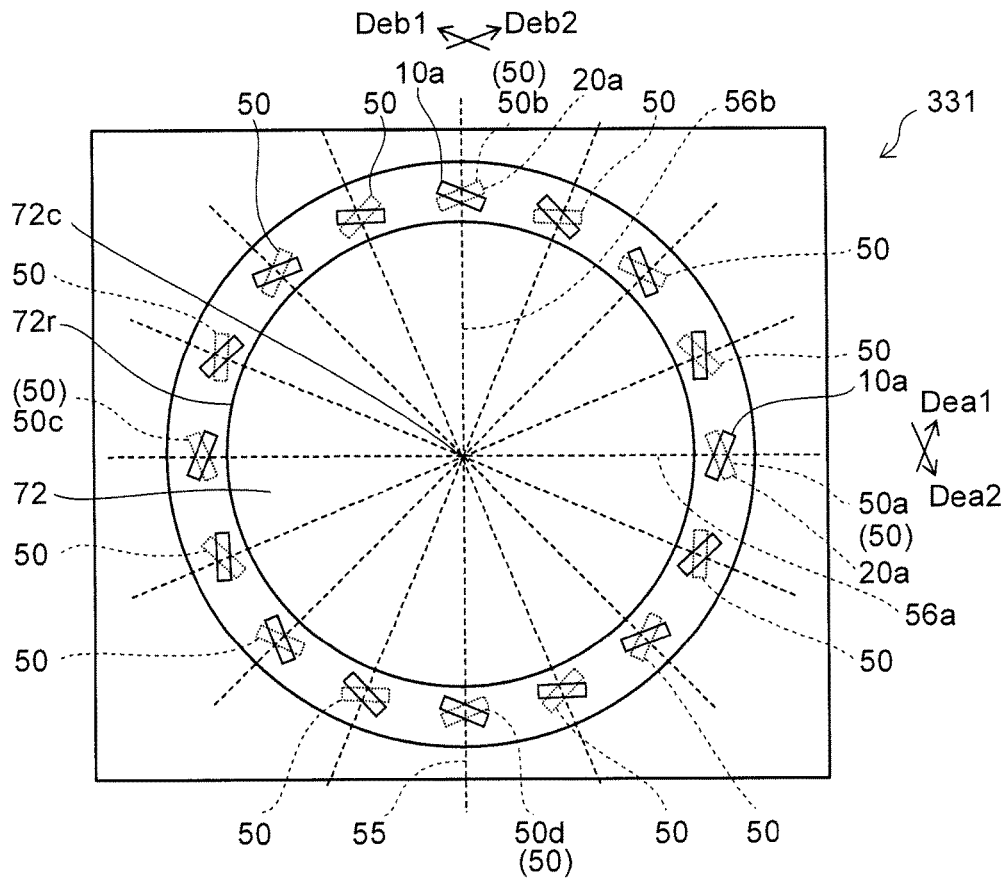
FIG. 21 is a schematic plan view showing another inertial sensor according to the third embodiment.

FIG. 21 is a schematic plan view illustrating another inertial sensor according to the third embodiment.

FIG. 21 is a plan view of the inertial sensor 331 according to the embodiment. In FIG. 21, for easier viewing of the drawing, the boundary between portions provided in the connection portion 74 (the first portion 74a, the second portion 74b, etc.) is omitted.

As shown in FIG. 21, a plurality of sensing element units 50 (the first sensing element unit 50a, the second sensing element unit 50b, etc.) are provided along the outer edge 72r of the weight portion 72.

In this example, when projected onto the X-Y plane, the straight line 56a passing through the centroid 7c of the weight portion 72 and the first sensing element unit 50a, and the first extending direction Dea1 of the first magnetic layer 10a cross each other. The straight line 56a and the second extending direction Dea1 of the second magnetic layer 20a cross each other. In this example, the angle between the straight line 56a and the first extending direction Dea1 is equal to the angle between the straight line 56a and the second extending direction Dea1.

In this example, when projected onto the X-Y plane, the straight line 56b passing through the centroid 7c of the weight portion 72 and the second sensing element unit 50b, and the third extending direction Deb1 of the third magnetic layer 10b cross each other. The straight line 56b and the fourth extending direction Deb2 of the fourth magnetic layer 20b cross each other. In this example, the angle between the straight line 56b and the third extending direction Deb1 is equal to the angle between the straight line 56b and the fourth extending direction Deb2.

The inertial sensor 331 enables sensing with higher sensitivity.

In the case where the extending directions of the magnetic layers included in the sensing element unit 50 are different, the angle between extending directions is arbitrary. The angle between the straight line passing through the centroid 72c of the weight portion 72 and the sensing element unit 50 and the extending direction of the magnetic layer is arbitrary.

Figure 22A:
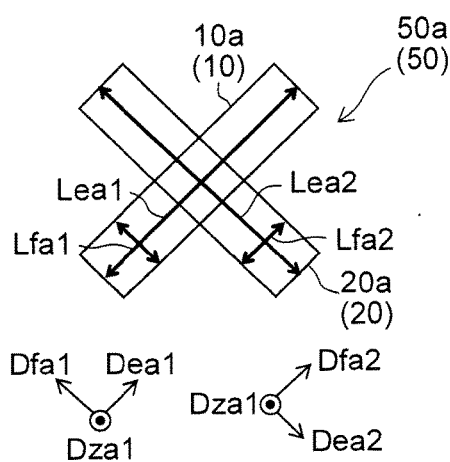
FIG. 22A and FIG. 22B are schematic plan views showing other inertial sensors according to the third embodiment.
Figure 22B:
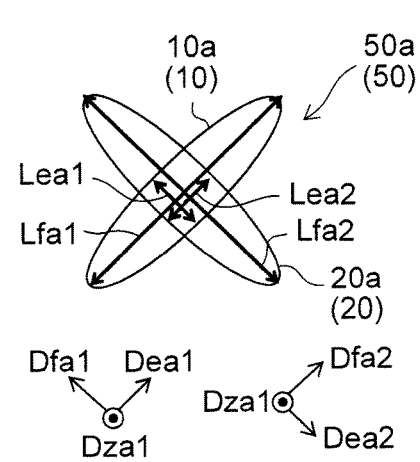

FIG. 22A and FIG. 22B are schematic plan views illustrating other inertial sensors according to the third embodiment.

The drawings illustrate configurations of the sensing element unit 50 (the first sensing element unit 50a) used for the inertial sensor 331. In the drawings, the intermediate layer 30 (the first intermediate layer 30a) is omitted. The drawings illustrate planar shapes of the first magnetic layer 10a and the second magnetic layer 20a.

In the example shown in FIG. 22A, the planar shape of each of the first magnetic layer 10a and the second magnetic layer 20a is a rectangle. In this case, the first major axis length Lea1 corresponds to the length of the long side of the rectangle. The first minor axis length Lfa1 corresponds to the length of the short side of the rectangle. The second major axis length Lea2 corresponds to the length of the long side of the rectangle. The second minor axis length Lfa2 corresponds to the length of the short side of the rectangle.

In the example shown in FIG. 22B, the planar shape of each of the first magnetic layer 10a and the second magnetic layer 20a is a flat circular shape (including an ellipse). In this case, the first major axis length Lea1 corresponds to the length of the major axis of the flat circle. The first minor axis length Lfa1 corresponds to the length of the minor axis of the flat circle The second major axis length Lea2 corresponds to the length of the major axis of the flat circle. The second minor axis length Lfa2 corresponds to the length of the minor axis of the flat circle.

In the embodiment, the planar shape of the magnetic layer may be variously modified.

Fourth Embodiment

Figure 23:
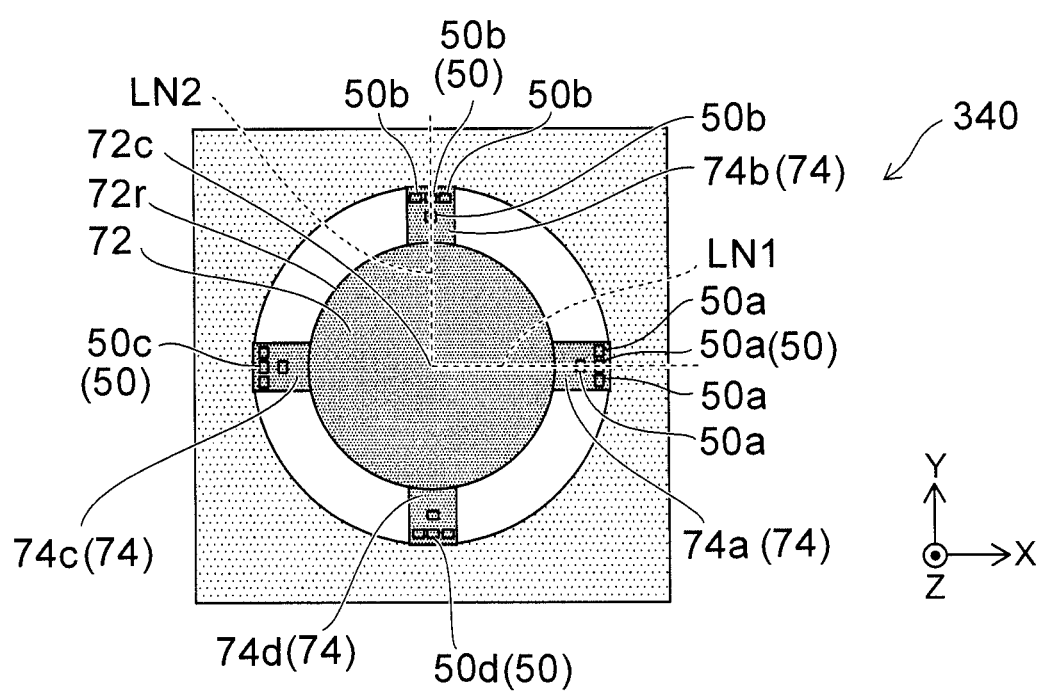
FIG. 23 is a schematic perspective view showing an inertial sensor according to a fourth embodiment.

FIG. 23 is a schematic perspective view illustrating an inertial sensor according to a fourth embodiment.

As shown in FIG. 23, in an inertial sensor 340 according to the embodiment, a plurality of sensing element units 50 (a plurality of first sensing element units 50a) are provided in the first portion 74a of the connection portion 74. In this example, a part of the plurality of first sensing element units 50a are aligned along a direction along the outer edge 72r of the weight portion 72. Another part of the plurality of first sensing element units 50a are aligned along the direction of the radial straight line running from the centroid 72c of the weight portion 72 toward the outer edge 72r (for example, the first direction LN1).

In this example, a plurality of second sensing element units 50b are provided in the second portion 74b of the connection portion 74. In this example, a part of the plurality of second sensing element units 50b are aligned along a direction along the outer edge 72r of the weight portion 72. Another part of the plurality of second sensing element units 50b are aligned along the direction of the radial straight line running from the centroid 72c of the weight portion 72 toward the outer edge 72r (for example, the second direction LN2).

When an acceleration 72g is applied, a strain is generated in each of the first portion 74a and the second portion 74b of the connection portion 74. By providing a plurality of first sensing element units 50a in the first portion 74a in which a strain in the same direction is generated, sensitivity is improved more. By providing a plurality of second sensing element units 50b in the second portion 74b in which a strain in the same direction is generated, sensitivity is improved more. The plurality of sensing element units 50 provided may be connected to one another in series or in parallel.

Figure 24A:
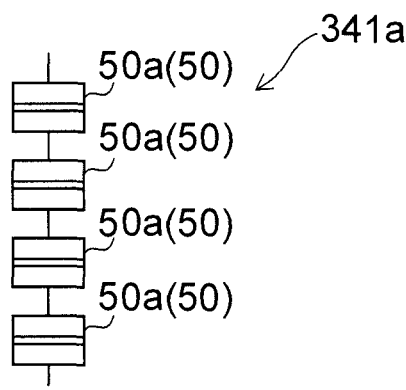
FIG. 24A to FIG. 24C are schematic diagrams showing inertial sensors according to the fourth embodiment.
Figure 24B:
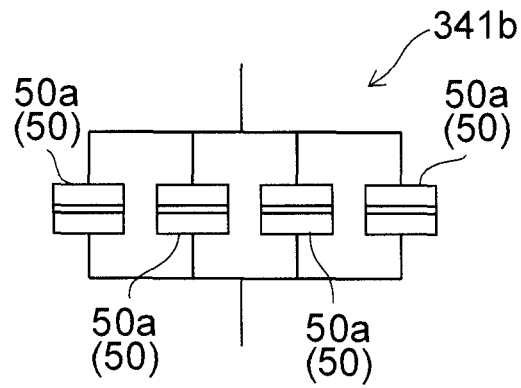
Figure 24C:
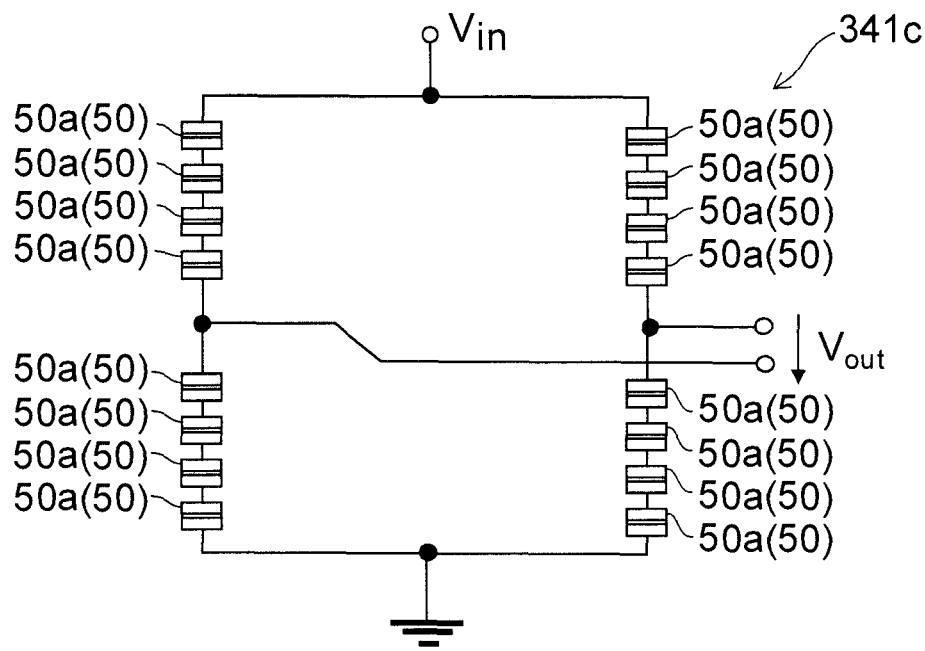

FIG. 24A to FIG. 24C are schematic diagrams illustrating inertial sensors according to the fourth embodiment.

The drawings show examples of the connection state of a plurality of sensing element units 50 (first sensing element units 50a).

As shown in FIG. 24A, in an inertial sensor 341a according to the embodiment, a plurality of sensing element units 50 are electrically connected in series. A plurality of first sensing element units 50a are provided on the first portion 74a, for example. At least two of the plurality of first sensing element units 50a are electrically connected in series.

When the number of sensing element units 50 connected in series is denoted by N, the electric signal obtained is N times of that when the number of sensing element units 50 is one. On the other hand, the thermal noise and the Schottky noise are $N^{1/2}$ times. That is, the S/N ratio (signal-noise ratio; SNR) is $N^{1/2}$ times. By increasing the number N of sensing element units 50 connected in series, the S/N ratio can be improved without increasing the size of the connection portion 74.

The change in electric resistance R with respect to the acceleration 72g (for example, polarity) is similar between first sensing element units 50a provided in the first portion 74a where the first sensing element unit 50a is provided, for example. Therefore, it is possible to sum up the signals of the plurality of first sensing element units 50a.

The bias voltage applied to one sensing element unit 50 is not less than 50 millivolts (mV) and not more than 150 mV, for example. When N sensing element units 50 are connected in series, the bias voltage is not less than 50 mV×N and not more than 150 mV×N. When the number N of sensing element units 50 connected in series is 25, the bias voltage is not less than 1 V and not more than 3.75 V, for example.

When the value of the bias voltage is 1 V or more, the design of an electric circuit that processes the electric signal obtained from the sensing element unit 50 is easy, and this is preferable in practical terms. A plurality of sensing element units 50 from which electric signals with the same polarity are obtained when pressure is produced are provided, for example. By connecting these sensing elements in series, the S/N ratio can be improved as mentioned above.

Bias voltages (inter-terminal voltages) exceeding 10 V are not preferable in the electric circuit that processes the electric signal obtained from the sensing element unit 50. In the embodiment, the number N of sensing element units 50 connected in series and the bias voltage are set so that an appropriate voltage range is obtained.

The voltage when the plurality of sensing element units 50 are electrically connected in series is preferably not less than 1 V and not more than 10 V, for example. The voltage applied between the terminals of the two ends of the plurality of sensing element units 50 (the first sensing element units 50a) electrically connected in series (between the terminal of one end and the terminal of the other end) is not less than 1 V and not more than 10 V, for example.

To generate this voltage, when the bias voltage applied to one sensing element 50 is 50 mV, the number N of sensing element units 50 connected in series is preferably not less than 20 and not more than 200. When the bias voltage applied to one sensing element unit 50 is 150 mV, the number N of sensing element units 50 (first sensing element units 50*a*) connected in series is preferably not less than 7 and not more than 66.

As shown in FIG. 24B, in an inertial sensor 341*b* according to the embodiment, a plurality of sensing element units 50 (first sensing element units 50*a*) are electrically connected in parallel. In the embodiment, at least part of a plurality of sensing element units 50 may be electrically connected in parallel.

As shown in FIG. 24C, in an inertial sensor 341*c* according to the embodiment, a plurality of sensing element units 50 (first sensing element units 50*a*) are connected so as to form a Wheatstone bridge circuit. Thereby, the temperature compensation of detected characteristics can be made, for example.

The embodiment can provide an inertial sensor that senses acceleration, displacement, etc. with high sensitivity.

Hereinabove, embodiments of the invention are described with reference to specific examples. However, the embodiment of the invention is not limited to these specific examples. For example, one skilled in the art may appropriately select specific configurations of components of inertial sensors such as base portions, weight portions, connection portions, sensing element units, magnetic layers, and intermediate layers from known art and similarly practice the invention. Such practice is included in the scope of the invention to the extent that similar effects thereto are obtained.

Further, any two or more components of the specific examples may be combined within the extent of technical feasibility; and such combinations are included in the scope of the invention to the extent that the spirit of the invention is included.

Moreover, all inertial sensors practicable by an appropriate design modification by one skilled in the art based on the inertial sensors described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A sensor comprising:
a first member;
a second member connected with the first member, the second member being deformable;
a third member connected with the second member, the second member being provided between the first member and the third member;
a first sensing element unit provided at a first portion of the second member, the first sensing element unit being provided between the first member and the third member in a first direction along an outer edge of the second member, the first sensing element including a first magnetic layer, a second magnetic layer, and a first intermediate layer, the first intermediate layer being provided between the first magnetic layer and the second magnetic layer and being nonmagnetic; and a second sensing element unit provided at a second portion of the second member, the second sensing element unit being provided between the first member and the third member in the first direction, the second sensing element including a third magnetic layer, a fourth magnetic layer, and a second intermediate layer, the second intermediate layer being provided between the third magnetic layer and the fourth magnetic layer and being nonmagnetic, wherein a length of the second member in the first direction is shorter than a length of the third member in the first direction, wherein the direction from a part of the first member connected with the second member toward a part of the second member connected with the third member is along the first direction.

2. The sensor according to claim 1, wherein a second direction from the first sensing element unit toward the second sensing element unit crosses the first direction.

3. The sensor according to claim 1, wherein the first sensing element unit and the second sensing element unit are electrically connected in series.

4. The sensor according to claim 1, further comprising:
a third sensing element unit provided at a third portion of the second member and including a fifth magnetic layer, a sixth magnetic layer, and a third intermediate layer, the third intermediate layer being provided between the fifth magnetic layer and the sixth magnetic layer and being nonmagnetic, and a direction from the first sensing element unit toward the third sensing element unit is along the first direction.

5. The sensor according to claim 1, wherein
the second member is configured to be deformed in accordance with a change in a relative position of the third member with respect to a position of the first member.

6. The sensor according to claim 1, wherein at least a part of the first magnetic layer includes iron and has an amorphous structure.

7. The sensor according to claim 6, wherein the at least the part of the first magnetic layer includes boron.

8. The sensor according to claim 1, wherein the second member includes a first side extending along the first direction.

9. The sensor according to claim 8, wherein
the second member further includes a second side extending along the first direction.

10. The sensor according to claim 1, wherein a length of the second member in a second direction crossing the first direction is shorter than a length of the third member in the second direction.

* * * * *